United States Patent [19]
Ishikawa et al.

[11] Patent Number: 5,689,264
[45] Date of Patent: Nov. 18, 1997

[54] OBSTACLE DETECTING SYSTEM FOR VEHICLES

[75] Inventors: Toshihiro Ishikawa; Ayumu Doi; Kenichi Okuda; Yasunori Yamamoto; Tomohiko Adachi; Tooru Yoshioka, all of Hiroshima, Japan

[73] Assignee: Mazda Motor Corporation, Hiroshima, Japan

[21] Appl. No.: 539,181

[22] Filed: Oct. 5, 1995

[30] Foreign Application Priority Data

Oct. 5, 1994 [JP] Japan ................... 6-241289

[51] Int. Cl.$^6$ ............................................. G01S 13/93
[52] U.S. Cl. .............................................. 342/70; 342/71
[58] Field of Search ........................... 342/70, 71, 72

[56] References Cited

U.S. PATENT DOCUMENTS

| | | | |
|---|---|---|---|
| 4,158,841 | 6/1979 | Wuchner et al. | 342/70 |
| 4,692,764 | 9/1987 | Bonar | 342/71 |
| 5,023,617 | 6/1991 | Deering | 342/70 |
| 5,283,622 | 2/1994 | Ueno et al. | 356/4 |
| 5,343,206 | 8/1994 | Ansaldi et al. | 342/70 |
| 5,485,892 | 1/1996 | Fujita | 180/167 |
| 5,534,870 | 7/1996 | Avignon et al. | 342/70 |

*Primary Examiner*—John B. Sotomayor
*Attorney, Agent, or Firm*—Sixbey, Friedman, Leedom & Ferguson, P.C.; Gerald J. Ferguson, Jr.; Donald R. Studebaker

[57] ABSTRACT

An obstacle detection system for vehicles detects kinetic attributes relative to a vehicle equipped with the system of an object present in a forward path of travel of the vehicle, sets a presumed zone into which the object is expected to have entered at a lapse of a specified period based on the kinetic attributes, and proves an object detected at a lapse of the specified period as the object previously detected if the object of second detection is determined as one having moved into the presumed zone and an obstacle precarious to the vehicle.

26 Claims, 21 Drawing Sheets

OBSTACLE DETECTING SYSTEM FOR VEHICLES

BACKGROUND OF THE INVENTION

1. Field of the invention

The resent invention relates to an obstacle detection system for vehicles which detects an object in the forward path of travel and determining whether the object is precarious to the vehicle detecting the object.

2. Description of Related Art

Typically, an obstacle detecting system of a vehicle includes a travel path presumption means for presuming a travel path on which the vehicle equipped with the system (which is hereafter referred to as the subject vehicle for discrimination from other vehicles) possibly travels based on current kinetic attributes of the vehicle, such as an angle of steering and a speed of the vehicle. Such an obstacle detecting means picks up as obstacles precarious to the vehicle, only objects present within a zone ahead of the vehicle in the presumed path of travel from data of kinetic attributes of the objects which are obtained by way of scanning a wide extent of the presumed forward path of travel by a radar means and determining the possibility that the vehicle might collide with these obstacles.

Generally speaking, with such an obstacle detecting system, where the radar means tries to detect, for instance, preceding vehicles traveling in ahead of the subject vehicle, if radar waves are reflected from reflectors or bodies of the preceding vehicles, the preceding vehicles are recognized as points or small zones. Since an object is determined as an obstacle by a point at the shortest distance from the subject vehicle, if there is a change in the current path of travel, a subject zone which is subject searched to detect obstacles changes, and at the same time the point which is at the shortest distance from the subject car shifts. Hence, although the same object may be present, there occurs a change in a relative speed between the object and the subject vehicle which is always a problem in the obstacle detecting system. Together, if the reflector of a preceding vehicle is dirty, while the preceding vehicle can be determined as an object when the vehicles are close to each other, it is, however, hardly detectable as an object at a farther distance from the subject vehicle traveling behind. As a result, although the vehicle is an object of a certain size, it will not be entirely detected as an obstacle.

One of systems for recognizing a preceding vehicle as an obstacle is known from, for instance, Japanese Unexamined Patent Publication No. 3-111785. The preceding vehicle recognition system includes a sweep scanning type of radar means which sweep scanning a predetermined angle of forward field with radar waves and receiving reflected waves so as to detect an object forward in the path of travel of the subject vehicle, a width detecting means for distinguishes the transverse size of the object from the results obtained by the radar means, an proving means for recognizing an object determined to have a transverse width, which is perpendicular to a direction of travel of the subject vehicle and within a predetermined extent, as a vehicle.

The preceding vehicle recognition system regards as a vehicle an object having a transverse width which is perpendicular to a direction of travel of the subject vehicle and is in a specified extent, based on the transverse size of the subject and a directional angle with respective to the subject vehicle both of which are known from results of detection by the radar means. However, there are large variations in directional angle and lateral size of an object, as determined by the radar, making precise recognizing objects difficult. In addition, for instance, when two preceding vehicles are traveling side by side at the same speed, these vehicles might be recognized as one object.

SUMMARY OF THE INVENTION

It is an object of the present invention to provide an obstacle detection for vehicles which is capable of precisely detecting an object ahead of the vehicle as an obstacle precarious to the vehicle.

The above object of the invention is accomplished by providing an obstacle detection system which detects an object present in forward path of travel of the vehicle, on which basis a determination is made as to whether an obstacle is present.

The obstacle detection system of the invention includes an object detecting means, such as a radar unit, for detecting kinetic attributes relative to the vehicle of an object present in a forward path of travel of the vehicle, an object zone setting means for setting a presumed object zone into which the object is presumed to have entered at a lapse of a predetermined period of time based on the kinetic attributes provided during a first detection of the object, and an object proving means for proving an object second detected at a lapse of the predetermined period of time by the object detecting means as the object of the first detection when the object of the second detection is determined to be one that has moved into the presumed object zone based on comparison of kinetic attributes provided during the second detection of the object with the presumed object zone. The kinetic attributes, which shall mean and refer to various physical factors necessary to define and/or related to motion of an object and the subject vehicle and relative motion therebetween, include at least a distance between an object, or a position related to the object, and the vehicle, a directional angle of an object, or a position associated to the object, relative to the object, velocities of an object and the vehicle, a relative velocity between an object and he vehicle, even geometric sizes, such as length, width and area, of an object and the like.

The obstacle detection system further includes an object entry means for selecting, on the basis of a predetermined condition, objects estimated as obstacles precarious to the vehicle among a plurality of objects proved by the object proving means and entering only the selected objects as obstacles, and object identifying means for comparing kinetic attributes of each object entered with those of another so as to determine identity of each object with another. In addition, the obstacle detection system includes zone setting means for setting an object search zone surrounding the presumed object zone. The object proving means proves an object of the second detection as the object of the first detection when the object of the second detection is determined to be one that has moved into one of the presumed object zone and the object search zone as a result of comparison of kinetic attributes provided during the second detection of the object with the presumed object zone and the object search zone.

The object detecting means detects an object a number of times in a predetermined detection period of time and determines a size of the object by a method of data averaging. An object may be defined by one of the kinetic attributes most suitable for obstacle determination.

The object entry means restricts objects to be entered to less than a predetermined number. If the number of objects exceeds the limited number, the object entry means cancels entry of objects in order of unnecessary degree for obstacle determination so as to enter only less than the predetermined number of objects. Further, the object entry means deletes any object already having been entered when the object detecting means does not detect an object identical to the entered object continually a predetermined number of times. Standards or conditions for object selection may be changed between lengthwise distances from the vehicle within and beyond a predetermined distance.

For obstacles precarious to the vehicle, the object entry means selects objects present within a predetermined lateral width stretching from a center line of the forward path of travel when a lengthwise distance to an object is within the predetermined distance and objects present within a predetermined directional angular with respect to the center line of the forward path of travel when a lengthwise distance of an object is beyond the predetermined distance. The predetermined distance may be changed according to the velocity of the vehicle.

When an object of the second detection is determined to have moved into and been present in both the presumed object zone and the object search zone, the object proving means proves that the object has moved into one of the presumed object zone and the object search zone in which smaller one of the objects is present.

The object zone setting means changes the presumed object zone in lateral distance between lengthwise distances from the vehicle within and beyond the predetermined distance. The object zone setting means may change the presumed object zone in lengthwise distance according to distances of an object from the vehicle.

With the obstacle detecting system of the invention, obstacle detection is carried out accurately, immediately and reliably.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE PREFERRED EMBODIMENTS

Figure 1:
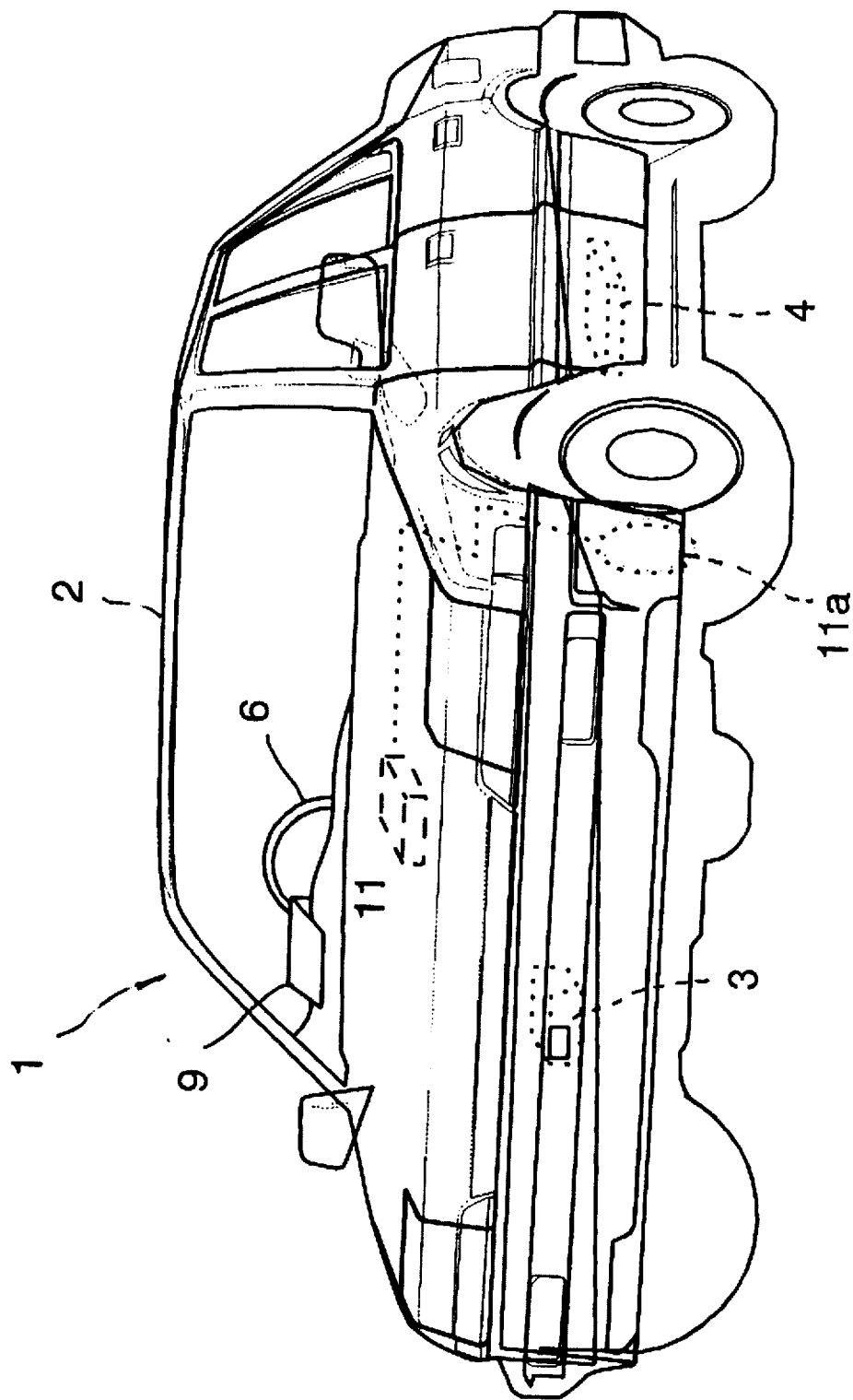
FIG. 1 is a schematic illustration of an automotive vehicle equipped with an obstacle detecting system in accordance with an embodiment of the present invention.

Referring to the drawings in detail, in particular, to FIG. 1 showing an outline of an obstacle detection system in accordance with an embodiment of the present invention installed an automotive vehicle 1, the obstacle detection system includes a radar head unit 3 attached to the front of a vehicle body 2 for detecting an object (which is practically the entire portion or a portion of the object) present ahead in the path of travel of the vehicle 1 equipped with the obstacle detecting system (which is hereafter referred to as the subject vehicle for discrimination from other vehicles). The radar head unit 3 generates a pulse laser beam as a radar wave forward ahead of the subject vehicle 1 and receives reflected waves from objects which may be obstacles against the subject vehicle, such as a preceding vehicle present in the path ahead of the subject vehicle. According to data of the laser pulse emission and reception, the radar unit 3 detects the distance to the object (obstacle) in the path ahead of the subject vehicle. The laser unit 3 is of the type which scans a relatively wide angle of field horizontally with a pulse laser beam spread vertically wide like a sector.

Figure 2:
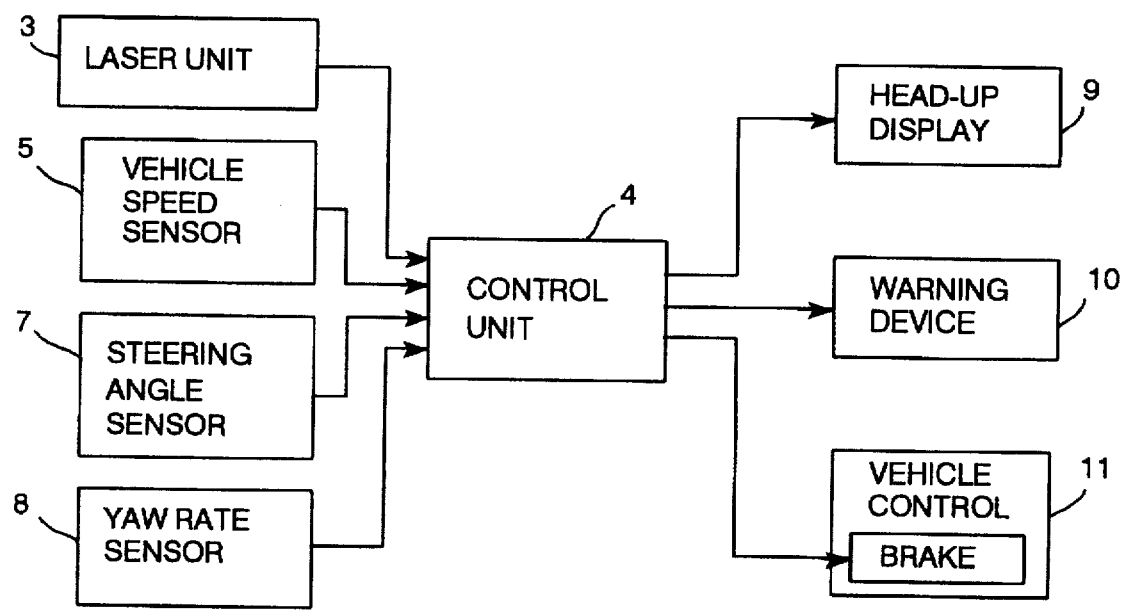
FIG. 2 is a block diagram schematically illustrating a safety driving system including the obstacle detecting system.

The obstacle detection system further includes a control unit 4, as depicted in FIG. 2, which receives signals including, in addition to a distance signal from the laser unit 3, a signal representative of a velocity of the vehicle from a speed sensor 5, and a signal of an angle of steer (which is referred to as a steering angle) of a steering wheel 6 from an angle sensor 7 and a signal representative of a yaw rate of the subject vehicle from a yaw rate sensor 8. Upon the basis of these signals, a current state of the path of travel is displayed on a head-up display 9. Once an object or objects, which are possibly objects precarious to the subject vehicle, are detected ahead of the vehicle, a warning device 10 is activated and, at the same time, a vehicle control device 11 causes the brakes 11a to automatically apply braking force to each of the wheels of the subject vehicle.

Figure 3:
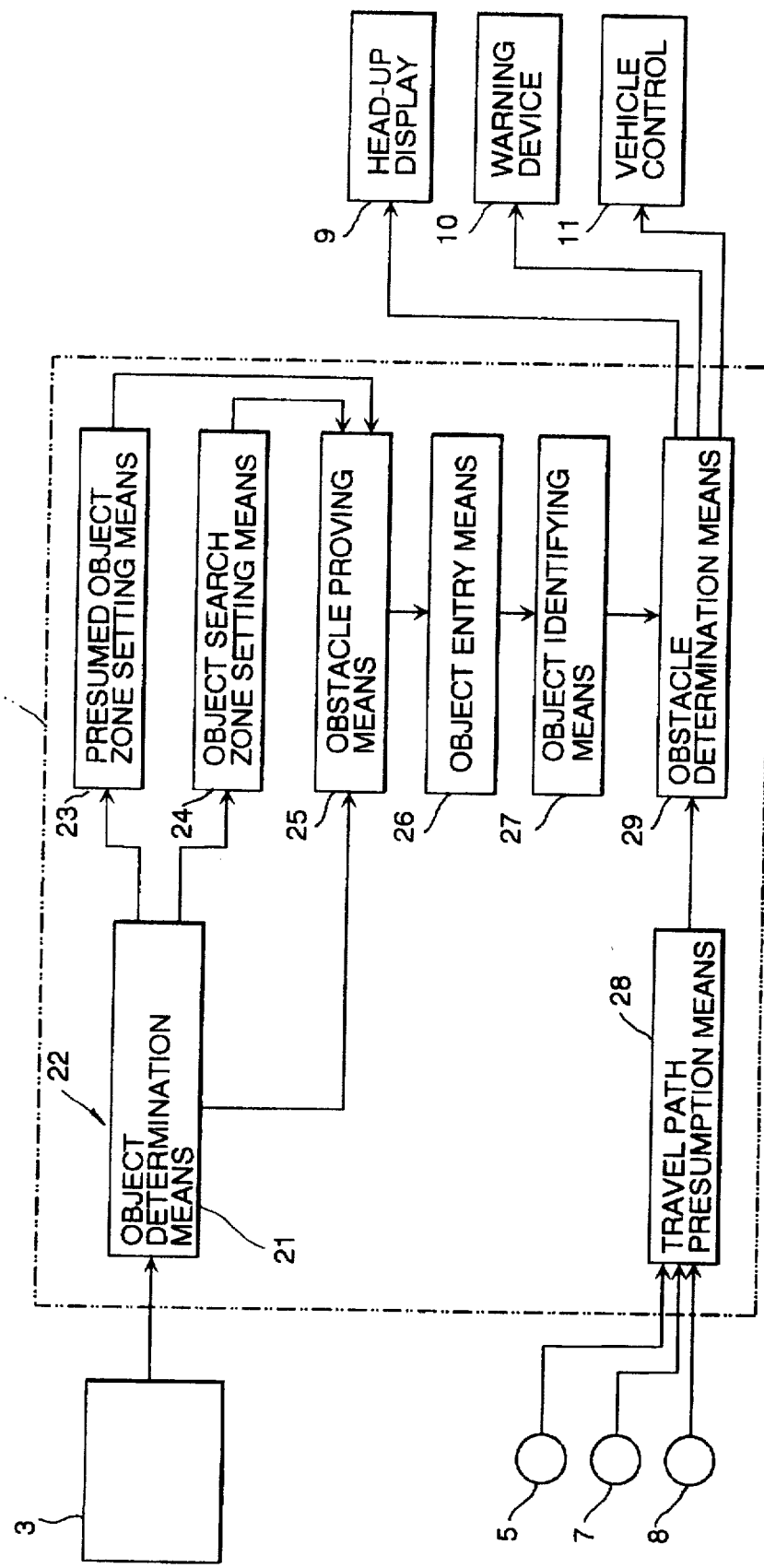
FIG. 3 is a bloc diagram illustrating a control unit of the obstacle detecting system.

As shown in FIG. 3, the control unit 4 is endowed with an object detecting means 22 comprising the radar head unit 3 ann an object determination means 21 which receives an output of the radar head unit 3 and determines whether or not an object is in the path ahead of the subject vehicle 1 and provides signals concerning kinetic attributes of the object determined to be in the path. In addition, it has a presumed zone setting means 23, a subject search zone setting means 24, an obstacle proving means 25, an object entry means 26, an object identifying means 27, a travel path presuming means 28, and an obstacle determining means 29. The presumed zone setting means 23 receives output signals of the object detecting means 22 and presumes and sets a zone in which an detected object is presumed to be present at a lapse of a predetermined period of time on the basis of the kinetic attributes represented by the signals from the detected object. The subject search zone setting means 24 receives the output signals of the object detecting means 22 and sets subject search zones around entirely or partly the periphery of the presumed zone. The obstacle proving means 25 receives the output signals of the object detecting means 22, the presumed zone setting means 23 and the subject search zone setting means 24, determines movement of the object detected by the object detection means 22 at a lapse of a specified period of time by comparing the object with the presumed zone and the subject search zone on the basis of the signals, and, from the fact of the movement of the object, proving the object. The object entry means 26 receives an output signal from the obstacle proving means 25 and selects objects which may be obstacles precarious to the subject vehicle from among the proved objects and enters the selected objects as obstacles. The object identifying means 27 receives output signals of the obstacle proving means 26 and compares kinetic attributes of the newly entered obstacles with those of the previously entered obstacles so as to determine whether or not the newly entered obstacle is identical to any one of the previously entered obstacles. Also, in this manner, on the basis of an obstacle or obstacles which have been selectively processed by the identifying means 27, a determination of the presence of an obstacle is made by means of the obstacle determining means 29 with respect to the path of travel established by a travel path presuming means 28.

It is to be noted that the term "kinetic attributes" used herein shall mean and refer to various physical factors concerning relative motion of an object to the subject vehicle, including a distance of an object from the subject vehicle, a direction or angle of travel of an object with respect to the subject vehicle, a relative velocity between an object and the subject vehicle, a size of an object and the like.

The object determining means 21 precisely detects and determines the size of an object by means of averaging multiple data relating to the same object having detected by the radar unit 3 within a specified period of time. In addition, it detects and determines, as an kinetic attribute for optimized obstacle determination, an optimal value, for example the shortest distance from the vehicle, from among the multiple data relating to the same object detected in a specified period of time, thereby improving the preciseness of obstacle determination. Furthermore, the obstacle determining means 21 is constructed such that the extent of object detection is changed in accordance with the distance to an object from the subject vehicle. In other words, the extent of object detection is set with a predetermined width from the center line of the subject vehicle for distances within a specified distance from the subject vehicle and is set with a predetermined angle of view relative to the center line of the subject vehicle for distances exceeding the predetermined distance. In this manner, the reach of object detection is restricted to an extent within which an object or objects regarded as obstacles precarious to the subject vehicle are expected to be present so as to increase the, efficiency of object detection.

The presumed zone setting means 23 is designed to change the size of a presumed zone, namely length and width, between for forward distances from the subject vehicle within the predetermined distance and for forward distances exceeding the predetermined distance. Specifically, the size of presumed zone is set to be larger for forward distances within the predetermined forward distance than for forward distances exceeding the predetermined distance, so as to reduce the influence of noises caused within the predetermined forward distance from the subject vehicle.

In order for the object proving means 25 to increase its proving efficiency, it proves unconditionally that an object has moved into the presumed zone if the object is determined to be present in within the presumed zone. On the other hand, If an object is determined to be outside of the presumed zone and the subject search zone, the object is proved to be a new object. In addition, if the object proving means 25 determines that objects belong to both presumed zone and subject search zone, then, it is proved that the object has moved to one of these two zones where smaller one of the objects is present, preventing an object of which the identity is determined from becoming unconditionally large in size for the purpose of the precise identification of object by the identifying means 27.

For the speed of processing, the obstacle entry means 26 restricts the total number of obstacles selectively recorded to less than a specified number, for example 40 obstacles in the present embodiment. For example, if the number of obstacles selectively designated as precarious exceeds the specified number, obstacles are erased in order of least requirement for obstacle determination until the number of still recorded obstacles is held below the specified number. In addition, if an object having been recorded as an obstacle by means of the obstacle entry means 26 cannot be continuously detected for a specified number of times by means of the object detecting means 22, since the object is considered not to be present within a detection field, it is erased from the record. In addition, the object entry means 26 changes entry standards on the basis of which an object is selected as an obstacle between for forward distances within the predetermined forward distance from the subject vehicle and for forward distances exceeding the predetermined forward distance. For example, within the specified forward distance to the subject vehicle, the object entry means 26 selects an object within a specified width of the path of travel from the center line of the subject vehicle as a reference in consideration of an object rushing out from sides of the path. On the other hand, for distances exceeding the specified forward distance, the object entry means 26 selects an objects within a specified angle of view with respect to the center line of the path of travel as a reference in consideration that the subject vehicle takes a certain time to travel the specified forward distance and that, even if there is no objects present in the path of travel, a vehicle or vehicles possibly travel to the path of travel of the subject vehicle.

Alternatively, while, within the specified forward distance to the subject vehicle, the object entry means 26 selects an object within a specified width of the path of travel from the center line of the subject vehicle as a reference in consideration of an object rushing out from sides of the path, it may selects only objects traveling toward the subject vehicle based on vectors of relative velocity between them. In this instance, data of kinetic attributes of the obstacles entered by the obstacle entry means 26 are changed or renewed at fixed intervals on the basis of the proof by the object proving means 25, so that the obstacle entry means 26 holds data as close as an actual state and avoids unnecessary determination of obstacles.

The identifying means 27 is adapted so that, since an object present in the path of travel is moving, it is not considered to be so large in size, the identifying conditions are changed depending upon whether the recorded obstacle is a still object or a moving object.

The travel path presuming means 28 presumes the path of travel of the subject vehicle on the basis of its own vehicle velocity V and an steering angle φ detected by the vehicle speed sensor 5 and the steering angle sensor 7, respectively. Practically, the curvature radius R1 of the path of travel is given by the following formula.

$$R1 = (1 + A \cdot V^2) \cdot LB \cdot N/\phi$$

where A is the stability factor;

N is the steering gear ratio; and

LB is the wheel base.

Alternatively, on the basis of a yaw rate τ and a vehicle velocity V detected by the yaw rate sensor 8 and the vehicle speed sensor 5, respectively, the path of travel of the subject vehicle can also be presumed, in which the curvature ratio radius R2 of the path of travel is given by the following formula.

$$R2 = V/\tau$$

In this instance, if there is a cant in a curved portion of a high way or the like, the steering angle φ does not conform with an actually executed angle of steering. In such a case, the curvature radius of the path of travel found on the basis of the steering angle φ becomes greater then the actual curvature radius. In addition, while traveling in a straight path, the steering wheel is ordinary steered, but slightly, to left and right. Therefore, if the path of travel of the vehicle is presumed following the steering angle φ, then there are occasions in which the predicted path of travel does not conform with the actual path of travel. For this reason, when a steering angle φ is less than a specified angle, selection is made of the curvature radius R2 of the path of travel calculated from an yaw rate τ and a vehicle velocity V. On the other hand, when the steering angle φ is greater than the specified angle, then it is preferred to select either one of the curvature radii R1 and R2 of the path of travel which is lesser than another. In other words, when a vehicle corners on a curved road with a cant, the vehicle can corner responding to the cant with not greatly steering, owing to the fact, the curvature ratio radius R2 on the basis of the yaw rate τ produced in the vehicle gives accurate prediction of the path of travel of the vehicle. In addition, when the vehicle veers sharply, the curvature radius R1 corresponding to a steering angle φ which is large is selected, and when the vehicle is traveling in a straight line. On the other hand, when traveling in a straight path, since the steering wheel is only slightly moved and, however no yaw rate τ is produced, the curvature radius R2 is selected on the basis of the yaw rate τ, for the path which is predicted to be a straight path.

Figure 4:
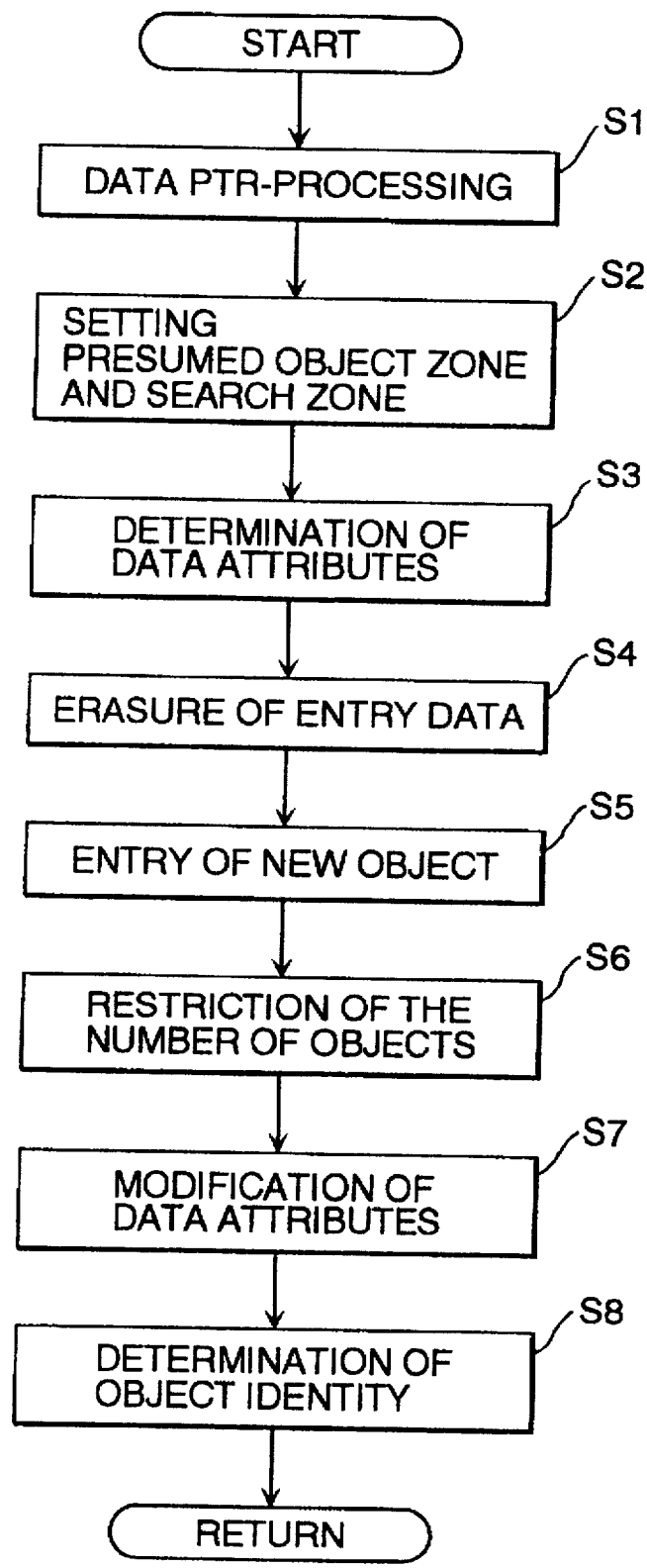
FIG. 4 is a flow chart illustrating a basic control sequence routine of obstacle detecting system.

In the operation of the control unit 4, as seen in FIG. 4, when the control commences, the radar unit 3 pre-processes the data relating to objects detected by object determining means 21 at step S1. Specifically, the scanned field of angle of 30° of the radar unit 3 is divided into 300 sections at equal angular degrees. From among the objects in the respective sections (which not always whole object and may be parts of objects), which are defined by forward distances from the subject vehicle, objects having the shortest distance from the subject vehicle are picked up as target objects most optimal for obstacle detection. On the basis of kinetic attributes (size, directional position, distance, and relative velocity, etc.) of each picked-up object, the presumed zone setting means 23 sets a zone into which each object is presumed to have moved at a lapse of a specified period of time. At the same time, since there is a possibility that the objects also move into a zone around the periphery of the presumed zone, the subject search zone setting means 24 sets a subject search zone which is subject searched whether the objects have moved into the zone at step S2. Following the setting of these presumed zone and subject search zone, determination is made of the kinetic attributes of each object. Specifically, the object proving means 25 makes comparison of the object defined by a forward distance from an subject vehicle, which is detected at a lapse of the specified period of time, with the respective presumed and subject search zones so as to determine movement of the object into the zones ar step S3. When the object has moved into any one of the zones, the object proving means 25 proves the object to be an object in detection. Further, the currently proved object is examined whether it is any one of these that the object entry means 26 has already registered. On the basis of the examination result, unnecessary objects, for example objects which have been registered once but are not currently detected, are erased at step S4. On the other hand, objects which are not identical with any one of these having been registered are registered as being new objects at step S5.

On the basis of the final registration of objects after the elimination and registration, selection is made under specified conditions to select objects utilized in obstacles detection at step S6, so as to make restriction on the total number of objects to be registered as obstacles. Subsequently, at step S7, based on the kinetic attributes of each registered object within the specified total number, kinetic attributes (size, directional position, distance, and relative velocity, etc.) of the object which are precarious to the subject vehicle are changed at step S7. In this manner, sequential processing of the detected objects are completed, and once objects which have the possibility of being obstacles are selectively registered, these registered objects are compared with one another in terms of their kinetic attributes and examined whether an object is the same one as another object at step S8. The objects of a number less than the specified number are then grouped and grasped as a cluster of several objects. Thereafter, the control sequence returns.

As described above, since the grouped objects are grasped as a single cluster of objects, there is no difference in the relative velocity between a group of objects. Accordingly, in comparison with making a determination for the respective objects separately, errors in discrimination are reduced, so that the determination of an obstacle, such as a collision prediction, can be accurately carried out.

Figure 5:
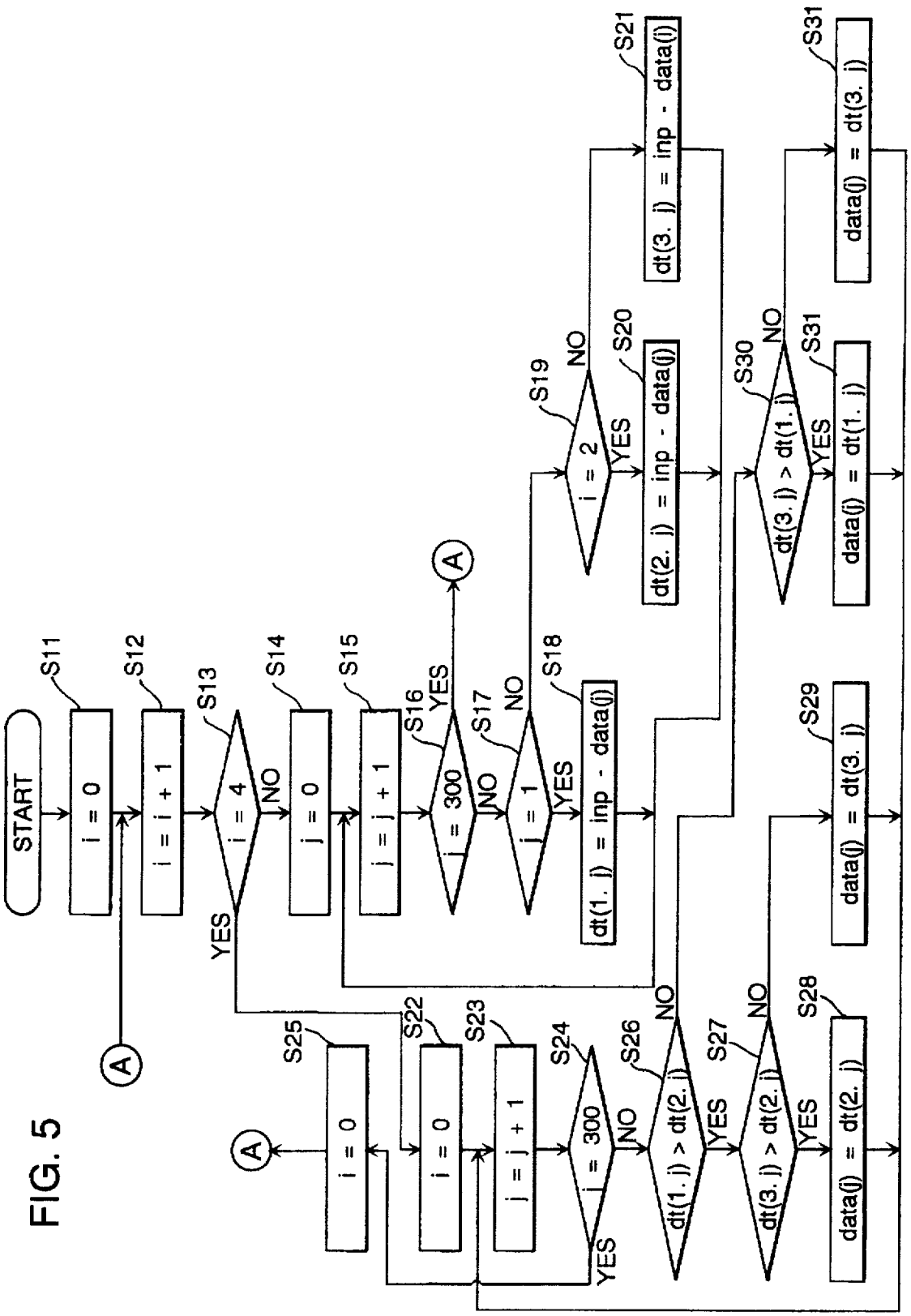
FIG. 5 is a flow chart illustrating an object selection sequence routine in which the shortest length is selected to define an object.

The forward distance of an object from the subject vehicle is detected through the sequence routine as shown in FIG. 5. When the sequence routine commences, the number of scanning times i (i=1, 2, 3) of the radar unit 3 is reset to zero (i=0) at step S11.

Thereafter, before first scanning, the scanning time number i is changed by an increment of 1 (one) at step S12. Subsequently, a decision is made at step S13 as to whether or not the scanning time number i is equal to four (4). If the scan number has reached four (4), then, the number j (j=1, ..., 300) of each division which is one of 300 equal angular divisions into which the scanning field of 30° is divided is reset to zero (j=0) at step S14. Subsequently, after incrementally changing the division number j by one (1) to a number of j+1 at step S15, a decision is made at step S16 as to whether or not the division number j is 300. If the division number is 300, this indicates that all of the angular divisions have been completed, the sequence returns to step S12. On the other hand, if the division number j is equal to 300, the sequence routine proceeds to step S17 where a decision is made as to whether or not the scan time i is one (1). If the scanning time number i is one (1), this indicate that the first scanning is being made, angle data dt(1, j) of the respective angular divisions obtained in the first scanning are input as current distance data inp-data(j) relating to objects at step S18. Thereafter, the sequence returns to step S15. On the other hand, if the scanning time number i is not equal to first (1), the sequence routine proceeds to step S19 where a decision is made as to whether or not the scanning time number i is second (2). If it is the second scanning, then, angle data dr(2, j) of the respective angular divisions obtained in the second scanning are input as current distance data inp-data(2, j) at step S20, and the sequence returns to step S15. if the scanning time number i is not equal to second (2), angle data dr(3, j) of the respective angular divisions obtained in the third scanning are input as distance data inp-data(3, j) at step S21, and the sequence routine returns to step S15. On the other hand, the result of the decision made at step S13 is "Yes," the division number j is reset to zero (0) at step S22. Thereafter, the division number j of each angular division is incrementally changed by one (1) at step S23, and a decision is subsequently made at step S24 as to whether or not the division number j is 300. If the division number j is 300, then the scanning time number i is reset to zero, at step S25, and the program returns to step S12. On the other hand, if the division number j is not equal to 300, then, the sequence routine proceeds to step S26 where a decision is made as to whether or not the distance data dt(2, j) relating to an object in the division j in the second scanning is smaller than the distance data dr(1, j) relating to an object in the same division j in the first scanning. If the second distance data dr(2, j) is smaller than the first distance data dr(1, j), then, another decision is made at step S27 as to whether or not the second distance data dr(2, j) relating to an object in the angular division j in the second scanning is smaller than the distance data dr(3, j) relating to an object in the same angular division j in the third scanning.

If the second distance data dr(2, j) is smaller than the third distance data dr(3, j), this indicates that the second distance data dr(2, j) is the shortest value, then, the distance data dr(2, j) is adopted as distance data(j) for objects in the respective angular divisions at step S28. Thereafter, the sequence routine returns to step S23. On the other hand, if the second distance data dr(2, j) is not smaller than the third distance data dr(3, j), this indicates that the third distance data dr(3, j) is the shortest value, the third distance data dr(3, j) is adopted as distance data(j) for objects in the respective angular divisions at step S29. Thereafter, the sequence routine returns to step S23. If the answer to the decision is made at step S26 is "No," i.e. if the second distance data dt(2,j) is not smaller than the first distance data dr(1, j), another decision is made at step S30 as to whether or not the first distance data dr(1, j) is smaller than the third distance data dt(3, j). If the first distance data dt(1, j) is smaller than the third distance data dr(3, j), the first distance data dr(1, j), which is the shortest value, is adopted as the distance data(j) of the respective angular divisions at step S31. On the other hand, if the first distance data dr(1, j) is not smaller than the third distance data dr(3, j), then, the third distance data dt(3,j), which is the shortest value, is adopted as the distance data(j) at step S32, and the sequence routine returns to step S23. Accordingly, with regard to the 300 divisions of the scanning field of angle of 30° of the radar head unit 3, while the distance data is obtained three times for each angular division, however, the shortest value is adopted as final data.

Figure 6:
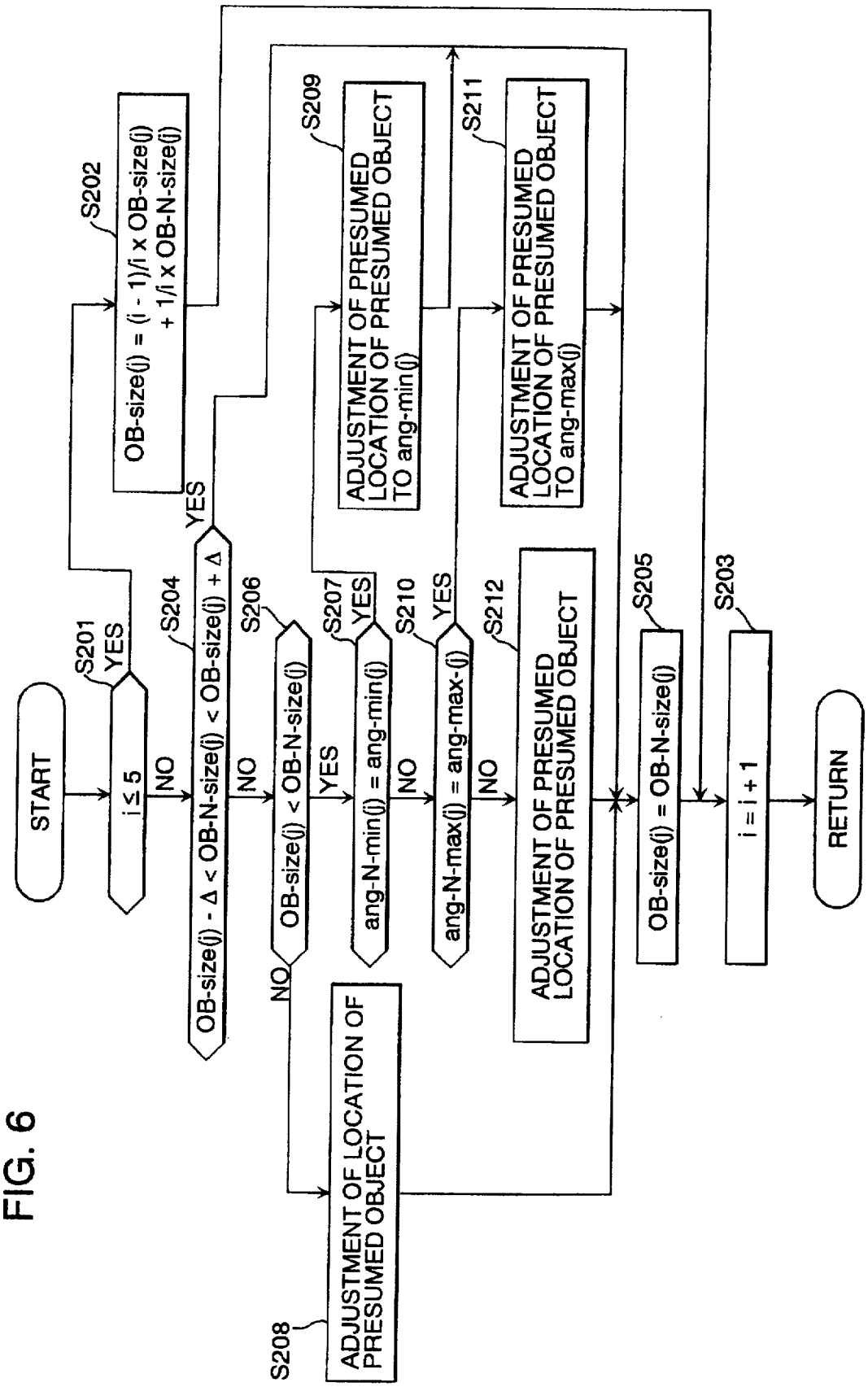
FIG. 6 is a flow chart illustrating an object size detection sequence routine.

The detection of object size is made according to the sequence routine shown in FIG. 6. When the sequence routine commences, a decision is made at step S36 as to whether or not the scanning time number i is less than five (5). If it is less than five, the sequence routine proceeds to step S37 where a calculation is made of the size OB-size(j) of an object relating to each angular division of number j according to the following formula.

$$OB\text{-}size(j)=(i-1)/i \times OB\text{-}size(j)+1/i \times OB\text{-}N\text{-}size(j)$$

Subsequently, the number of scanning times i is incrementally changed by one (1) at step S38.

If the scanning made more than five times, a decision is made at step S39 as to whether or not the size OB-N-size (j) of an object currently detected is within the specified extent of object size relating to the objects which have already been registered. If it falls within the specified extent, the object size OB-size (j) is substituted by the size OB-N-size (j) of the currently detected object at step S40. After changing the scanning time number i by an increment of one (1) at step S38, the sequence routine returns. On the other hand, if it does not fall within the specified extent, then, another decision is made at step S41 as to whether or not the size OB-N-size(j) of the currently detected object is greater than the object size OB-size(j) which has been averaged for the same angular division of number j. If it is greater, then a decision is made at step S42 as to whether or not the minimum angle ang-N-min(j) of the currently detected object is equal to the minimum angle ang-min(j) among those of the registered objects. On the other hand, if it is not larger, the presumed object position is corrected at step S43, and the sequence routine returns through steps S40 and S38.

If the answer to the decision made at step S42 is "Yes," then, an adjustment is made to the presumed object position so as to conform with the minimum angle ang-min(j) of the registered objects at step S44. Thereafter, the sequence routine returns through step S40 and S38. On the other hand, if they are not equal, a further decision must be made at step S45 as to whether or not the maximum angle ang-N-max(j) among those of the currently detected objects is equal to the maximum angle ang-max(j) of those of the registered objects. If the maximum angle ang-N-max(j) of the currently detected objects is equal to the maximum value ang-max(j) of the registered objects, then, a correction is made at step S46 to adjust the presumed object position according to the maximum angle ang-max(j) of the registered objects. On the other hand, if they are not equal to each other, a correction is made to adjust the presumed object position according to the maximum angle ang-max(j) at step S47, and the sequence routine returns through steps S40 and S38.

In this instance, with the control shown in FIG. 6, when the number of scanning times is greater than five (5), the size of object is finalized so as not to change any more. However, the size of object may be calculated and renewed every specified times of scanning.

Figure 7:
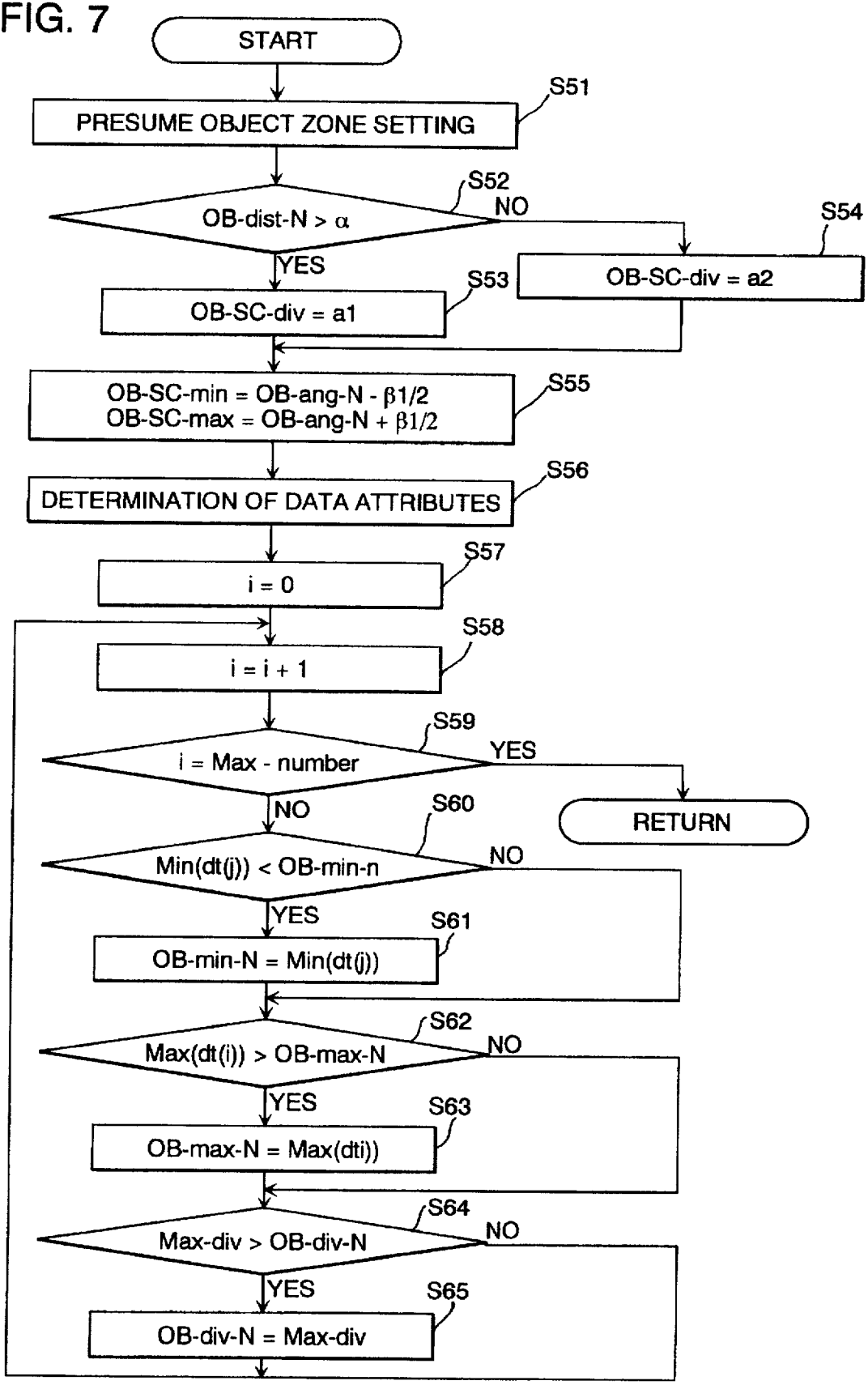
FIG. 7 is a flow chart illustrating a presumed object zone setting sequence routine.
Figure 8:
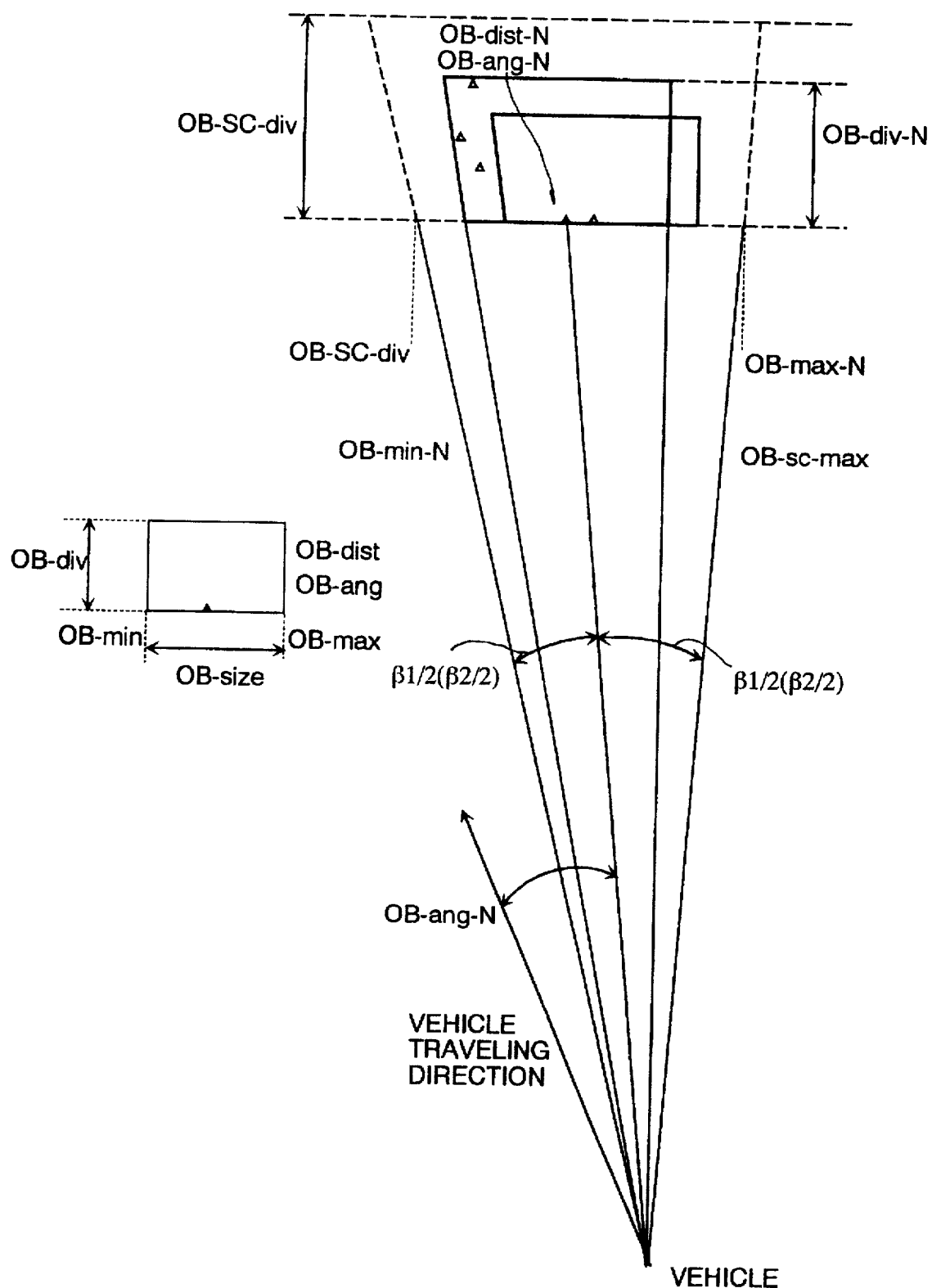
FIG. 8 is an illustration of an object and a presumed object zone for the object after a lapse of a predetermined period of time.

Setting a presumed object zone is carried out according to the sequence routine shown in FIG. 7. When the sequence routine starts, what is made through steps S51 to S55 is to presume, on the basis of the kinetic attributes of a detected object, a zone including a presumed object position into which the object is assumed to have moved before the passage of a specified period of time. In this instance, as shown in FIG. 8, with respect to each of the finally registered objects, kinetic attitudes are represented by OB-dist, OB-ang, OB-size, OB-div, OB-min and OB-max for the distance to a reference position of the object from the subject vehicle, the angular direction of the reference position with respect to the subject vehicle, the size in the object width, the size of the front to rear length of the object, the geometric dimension of the left end of the zone, and the geometric dimension of the right end of the zone, respectively. Similarly, with respect a presumed location of object where an object is expected to be currently detected, the kinetic attributes are represented by OB-dist-N, OB-ang-N, OB-div-N, OB-min-N and OB-max-N for the distance, the angular directional, the length, the geometric dimension of left and right ends of the zone, respectively. Furthermore, the relative velocity of an object relative to the subject vehicle is represented by r-vel, and the relative angular velocity of an object relative to the subject vehicle is represented by a-vel.

Specifically, the presumed position of object is given at step S51 on the basis of the following formula.

$$\text{OB-dist-N} = \text{OB-dist-r-vel} \times t$$
$$\text{OB-ang-N} = \text{OB-ang} - \text{a-vel} \times t$$
$$\text{OB-min-N} = \text{OB-ang-N} - \text{OB-size}/2$$
$$\text{OB-max-N} = \text{OB-ang-N} + \text{OB-size}/2$$
$$\text{OB-div-N} = \text{OB-div}$$

Subsequently, a decision is made at step S52 as to whether or not the distance OB-dist-N to the reference position of the presumed object location exceeds a specified threshold distance $\alpha 1$. In accordance with the result, a presumed object zone is set around the periphery of the presumed object location as indicated by broken line in FIG. 8. That is, if the distance OB-dist-N exceeds the threshold distance $\alpha 1$, then, the lengthwise distance OB-SC-div from the front to the rear of the presumed object zone is represented by a1 at step S53. On the other hand, if it is not exceeded, then, the lengthwise distance OB-SC-div of the presumed object zone is represented by a2 (>a1) at step S54. By this means, if the threshold distance $\alpha 1$ is not exceeded, a change is made so that the lengthwise distance OB-SC-div of the presumed object zone is larger than if it is exceeded, providing an increase in the detection accuracy by eliminating influence relating to data variations among objects to be detected and noises.

Subsequently, the distance of the left side end OB-SC-min of the presumed object zone from the reference position of the presumed object location is set to OB-ang-N-$\beta$½ and the distance of the right side end OB-SC-max of the presumed object zone is set to OB-ang-N+$\beta$½ at step S55 so that the presumed object zone has a stretch of an angle $\beta 1$ which centers on the reference position OB-ang-N of the presumed object location.

A decision is made at step S56 as to the kinetic attributes relating to the currently detected objects. That is, a decision is made for each of the currently detected objects as to which registered object the object belongs, as will be described with reference to FIGS. 16 and 17. On the basis of data relating to the currently detected object, a correction is made of the presumed object location. Specifically, after initializing the object number i assigned each object to zero at step S57, the object number i is changed by an increment of one (1) at step S58. Subsequently, a decision is made at step S59 as to whether or not the object number i is equal to the maximum object number Max-number. If it is equal to the maximum object number Max-number, the sequence routine returns directly. If they are not equal, then, another decision is made at step S60 as to whether or not the minimum angle Min(dt(i)) of the left end of the subject search zone is smaller than the minimum angle OB-min-N of the presumed object location. If the minimum angle Min(dt(i)) of the subject search zone is smaller than the minimum angle OB-min-N of the presumed object location, then, after substituting the minimum angle Min(dt(i)) of the subject search zone for the minimum angle OB-min-N of the presumed object location at step S61, another decision is made at step S62 as to whether or not the maximum angle OB-max-N of the presumed object location is smaller than the maximum angle Max(dt(i)) of the right side end of the subject search zone. If the maximum angle OB-max-N of the presumed object location is smaller than the maximum angle Max(dt(i)) of the right side end of the subject search zone, then the sequence routine proceeds directly to step S62. A result of the decision made in step S62 indicates that the maximum angle OB-max-N of the presumed object location is smaller than the maximum angle Max(dt(i)) of the subject search zone, then, after substituting the maximum angle Max(dt(i)) for the maximum angle OB-max-N of the presumed object location at step S63, the sequence routine proceeds to step S64. On the other hand, if the maximum angle OB-max-N of the presumed object location is not smaller than the maximum angle Max(dt(i)) of the subject search zone, then, the sequence routine immediately proceeds to step S64. According to the decision made in step S64, if the lengthwise distance OB-div-N of the presumed object location is smaller than the maximum length Max-div of the presumed object zone, then, after substituting the maximum length Max-div of the presumed object zone for the lengthwise distance OB-div-N of the presumed object location at step S65, the sequence routine proceeds to step S58. On the other hand, if the lengthwise distance OB-div-N of the presumed object location is not smaller than the maximum length Max-div of the presumed object zone, the sequence routine proceeds to step S58 without passing through step S65.

Figure 9:
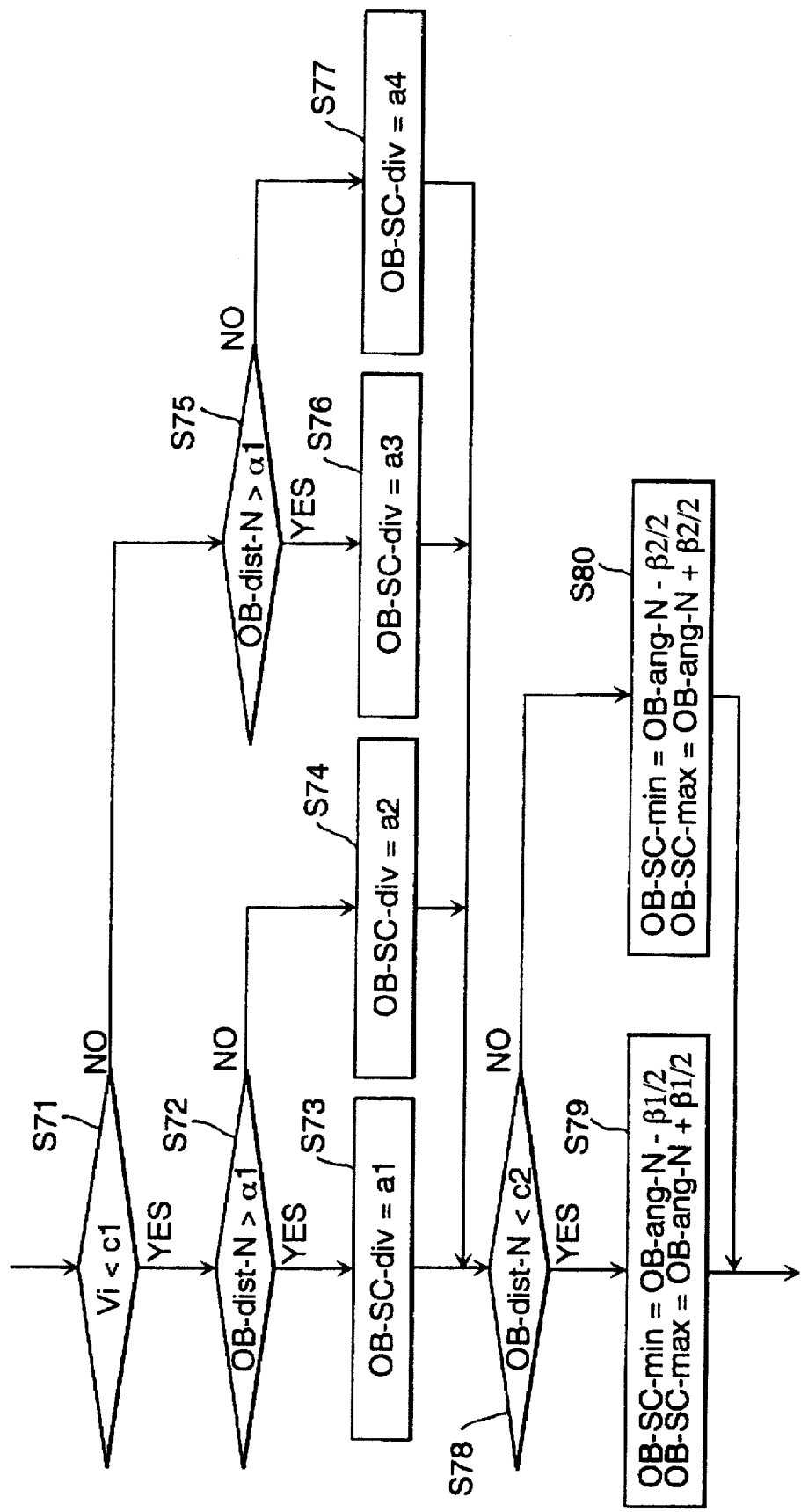
FIG. 9 is a flow chart illustrating a variation of the presumed object zone setting sequence routine.

In this instance, in the control sequence routine, the processing through steps S52–S55 may be replaced with steps S71–S80 shown in FIG. 9. Specifically, following the presumption of the object location, a decision is made at step S71 as to whether or not the relative velocity Vi between the subject vehicle and an object is less than a specified threshold velocity C1. If the relative velocity Vi is less than the threshold velocity C1, then, another decision is made at step S72 as to whether or not the distance B-dist-N to the reference position of the presumed object location exceeds the threshold distance $\alpha 1$. If the threshold distance $\alpha 1$ is exceeded, the lengthwise distance OB-SC-div of the presumed object zone is set to a specified length a1 at step S73. On the other hand, if it is not exceeded, then, the lengthwise distance OB-SC-div of the presumed object zone is set to another specified length a2 at step S74.

If the relative velocity Vi is not less than the threshold velocity C1, then, similarly to the processing in step S72, a decision is made at step S75 as to whether or not the distance OB-dist-N to the reference position of the presumed object location exceeds the threshold distance $\alpha 1$. If exceeding the threshold distance $\alpha 1$, the lengthwise distance OB-SC-div of the presumed object zone is set to a specified length a3 at step S76. On the other hand, if not exceeding the threshold distance α1, the lengthwise distance OB-SC-div of the presumed object zone is set to another specified length a4 at step S77. In this manner, the lengthwise distance OB-SC-div of the presumed object zone is changed in consideration of not only the distance OB-dist-N to the reference position of the presumed object location but also the relative velocity Vi. In this instance, the specified length are given in the relation of a1<a2<a3<a4.

Following the processing through steps S71–S77, a decision is made at step S78 as to whether or not the distance OB-dist-N to the reference position of the presumed object location is less than the threshold distance C2. If the distance OB-dist-N to the object reference position is less than the threshold distance C2, the distances of the left and right margins of the presumed subject zone are respectively given at step S79 as follows:

$$OB\text{-}SC\text{-}min = OB\text{-}ang\text{-}N - \beta\tfrac{1}{2}$$

$$OB\text{-}SC\text{-}max = OB\text{-}ang\text{-}N + \beta\tfrac{1}{2}$$

On the other hand, if the distance OB-dist-N to the object reference position is not less than the threshold distance C2, then, the distances of the left and right margins of the presumed subject zone are respectively given at step S80 as follows:

$$OB\text{-}SC\text{-}min = OB\text{-}ang\text{-}N - \beta_2\tfrac{1}{2}$$

$$OB\text{-}SC\text{-}max = OB\text{-}ang\text{-}N + \beta_2\tfrac{1}{2}$$

In this instance, $\beta_1 < \beta_2$. Thereafter, the sequence routine proceeds to step S56.

Accordingly, the lateral distances of the left and right margins of the presumed object zone are changed between forward distances within the specified distance and forward distances exceeding the specified distance.

Figure 10:
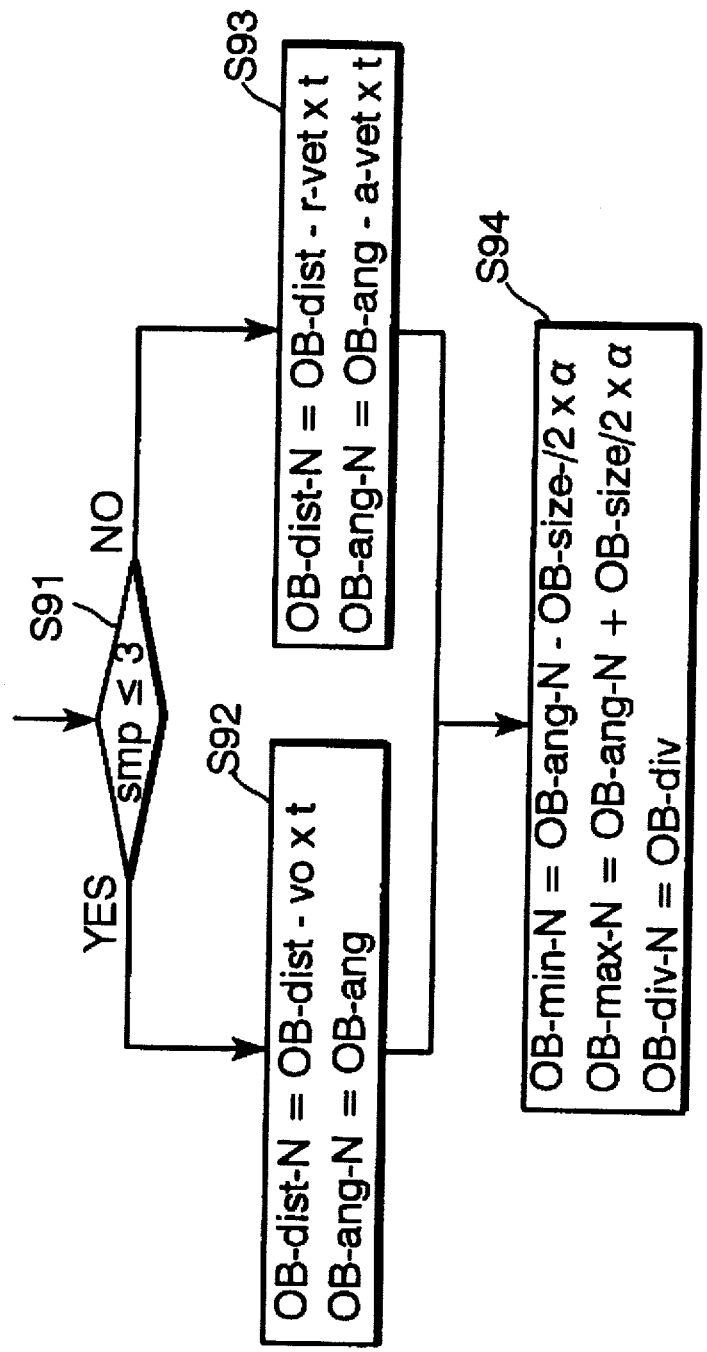
FIG. 10 is a flow chart illustrating a sequence routine for setting initial kinetic attributes.

In this instance, the initial size of the presumed zone is determined by the sequence routine shown in FIG. 10.

In FIG. 10, the sequence routine starts, a decision is made at step S91 as to whether or not a sampling number of times smp is less than 3. If it is less than 5 times, then, the presumed object location defined by distance and angular direction is given by the following formula at step S92:

$$OB\text{-}dist\text{-}N = OB\text{-}dist\text{-}v0 \cdot t$$

$$OB\text{-}ang\text{-}N = OB\text{-}ang$$

On the other hand, if the sampling number of times smp exceeds 5, then, the presumed object location is given by the following formula at step S93:

$$OB\text{-}dist\text{-}N = OB\text{-}dist\text{-}r\text{-}vel \cdot t$$

$$OB\text{-}ang\text{-}N = OB\text{-}ang\text{-}a\text{-}vel \cdot t$$

In this instance, v0 represents the vehicle velocity.

Thereafter, at step S94, the lateral distances of the left and right margins and the length of the presumed object location represented, respectively, by OB-min-N, OB-max-N and OB-div-N are given as follows:

| |
|---|
| OB-min-N = OB-ang-N − (OB-size/2) · α |
| OB-max-N = OB-ang-N + (OB-size/2) · α |
| OB-div-N = OB-div |

Figure 11:
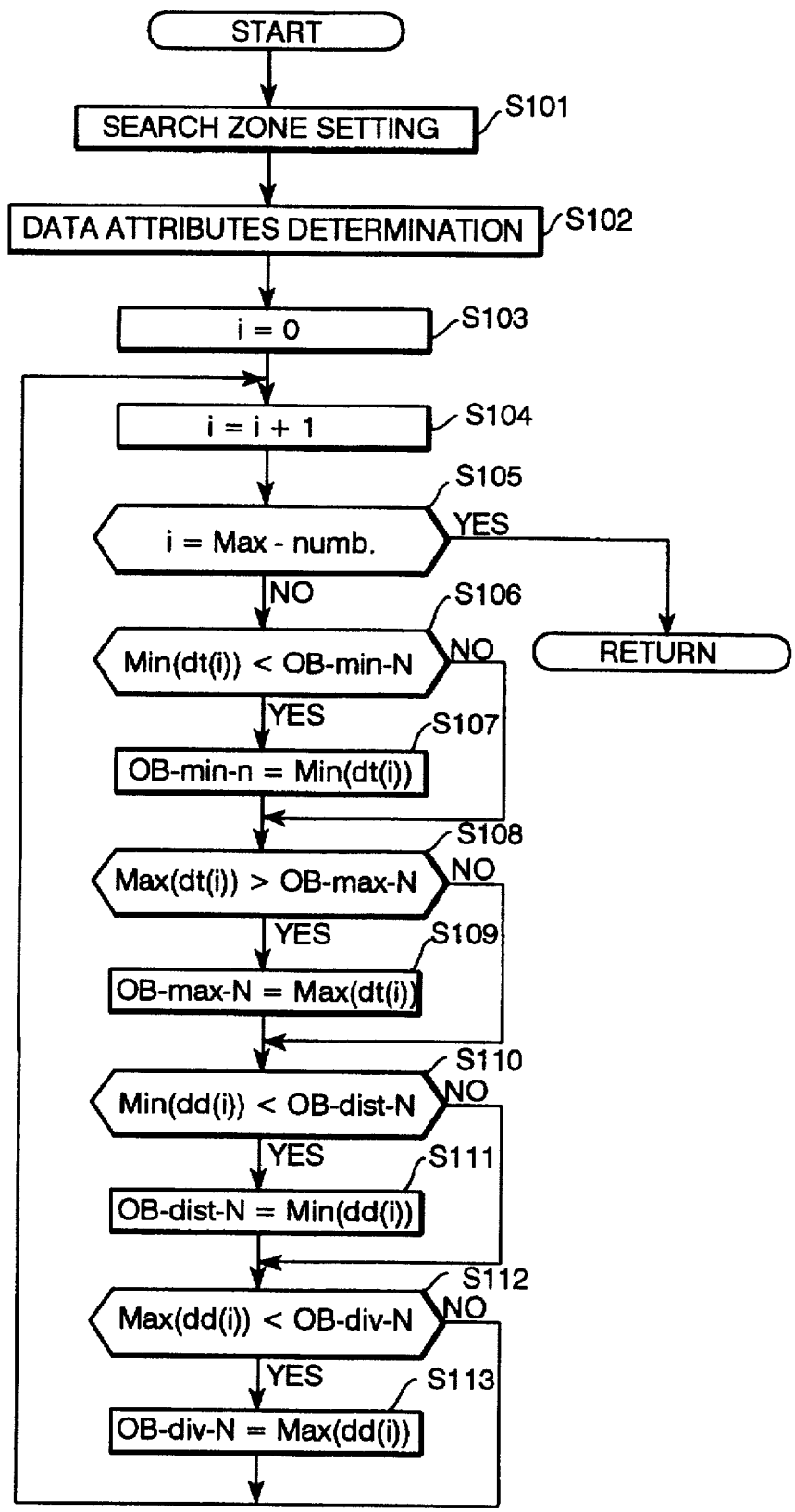
FIG. 11 is a flow chart illustrating an object search zone setting sequence routine.

Setting an object search zone is carried out according to the sequence routine shown in FIG. 11. When the sequence routine starts, an object search zone is set at step S101. the object search zone is set to be larger than and cover the presumed object zone. In this instance, the maximum distance to the object search zone from the subject vehicle is represented by OB-K-dist-max, the minimum distance to the object search zone from the subject vehicle is represented by OB-K-dist-min, and the lateral distances of the left and right margins of the object search zone are represented by, respectively, OB-K-min and OB-K-max. Letting b1, b2 and b3 be constants, the object search zone is initially given as follows:

| |
|---|
| OB-K-dist-max = OB-dist-N + OB-div-N + b1 |
| OB-K-dist-min = OB-dist-N − b3 |
| OB-K-max = OB-ang-N + b2/2 |
| OB-K-min = OB-ang-N − b2/2 |

Thereafter, the kinetic attributes of an detected object are determined on the basis of data relating to the detected object at step S102. In other words, the decision is made as to find whether or not the currently detected object is to be present in the object search zone. This decision will be described in detail with reference FIGS. 16 and 17.

Continuing, the presumed object location is corrected in relation to the object search zone. That is, the object discrimination number i is reset to zero at step S103, and thereafter is incrementally changed by one (1) at step S104. A decision is made in step S105 as to whether or not the object discrimination number i is equal to the maximum number of subject max-number. If it is equal, then the sequence routine returns. On the other, hand if it is not equal, then, another decision is made at step S106 as to whether or not the minimum angle OB-min-N of the presumed object location is larger than the minimum angle Min(dt(i)) of the object search zone. If the minimum angle OB-min-N of the presumed object location is larger than the minimum angle Min(dt (i)) of the object search zone, then, the minimum angle Min(dt(j)) is substituted for the minimum angle OB-min-N of the presumed object location at step S107. Therefore, a further decision is made at step S108 as to whether or not the maximum angle OB-max-N of the presumed object location is smaller than the maximum angle Max(dt(i)) of the object search zone. On the other hand, if the maximum angle OB-min-N of the presumed object location is not larger than the maximum angle Min(dt(i)) of the object search zone, then, the sequence routine immediately proceeds to step S108 where the decision is made as to whether or not the maximum angle OB-max-N of the presumed object location is smaller than the maximum angle Max(dt(i)) of the object search zone. If the maximum angle OB-max-N of the presumed object location is smaller than the maximum angle Max(dt)(i) of the object search zone, then, the maximum angle Max(dt(i)) is substituted for the maximum angle OB-max-N at step S109. Therefore, a decision is made at step S110 as to whether or not the distance OB-dist-N to the presumed object location is larger than the maximum distance Min(dd(i)) to the object search zone. On the one hand, if the maximum angle OB-max-N of the presumed object location is not smaller than the maximum angle Max(dt(i)) of the object search zone, then, the sequence routine immediately proceeds to step S110 where a decision is then made as to whether or not the distance OB-dist-N to the presumed object location is greater than the maximum distance Max(dd(i)) to the object search zone. If the distance OB-dist-N to the presumed object location is greater than the minimum distance Min(dd(i)) to the object search zone, then, the minimum distance Min(dd(i)) is substituted for the minimum distance OB-dist-N at step S111. Also, a decision is made at step S112 as to whether or not the lengthwise distance OB-div-N of the presumed object location is greater than the maximum distance Max (dd(i)) to the object search zone. On the one hand, if the distance OB-dist-N to the presumed object location is not greater than the minimum distance Min(dd(i)) to the object search zone, then, the sequence routine immediately proceeds to step S111. If the lengthwise distance OB-div-N is smaller than the maximum distance Max(dd(i)) to the object search zone, then, the maximum distance Max(dd(i)) is substituted for the lengthwise distance OB-div-N at step S113, and the sequence routine returns to step S104. On the other hand, if the lengthwise distance OB-div-N of the presumed object location is not smaller than the maximum distance Max(dd(i)) to the object search zone, the sequence routine immediately returns to step S104.

Figure 12:
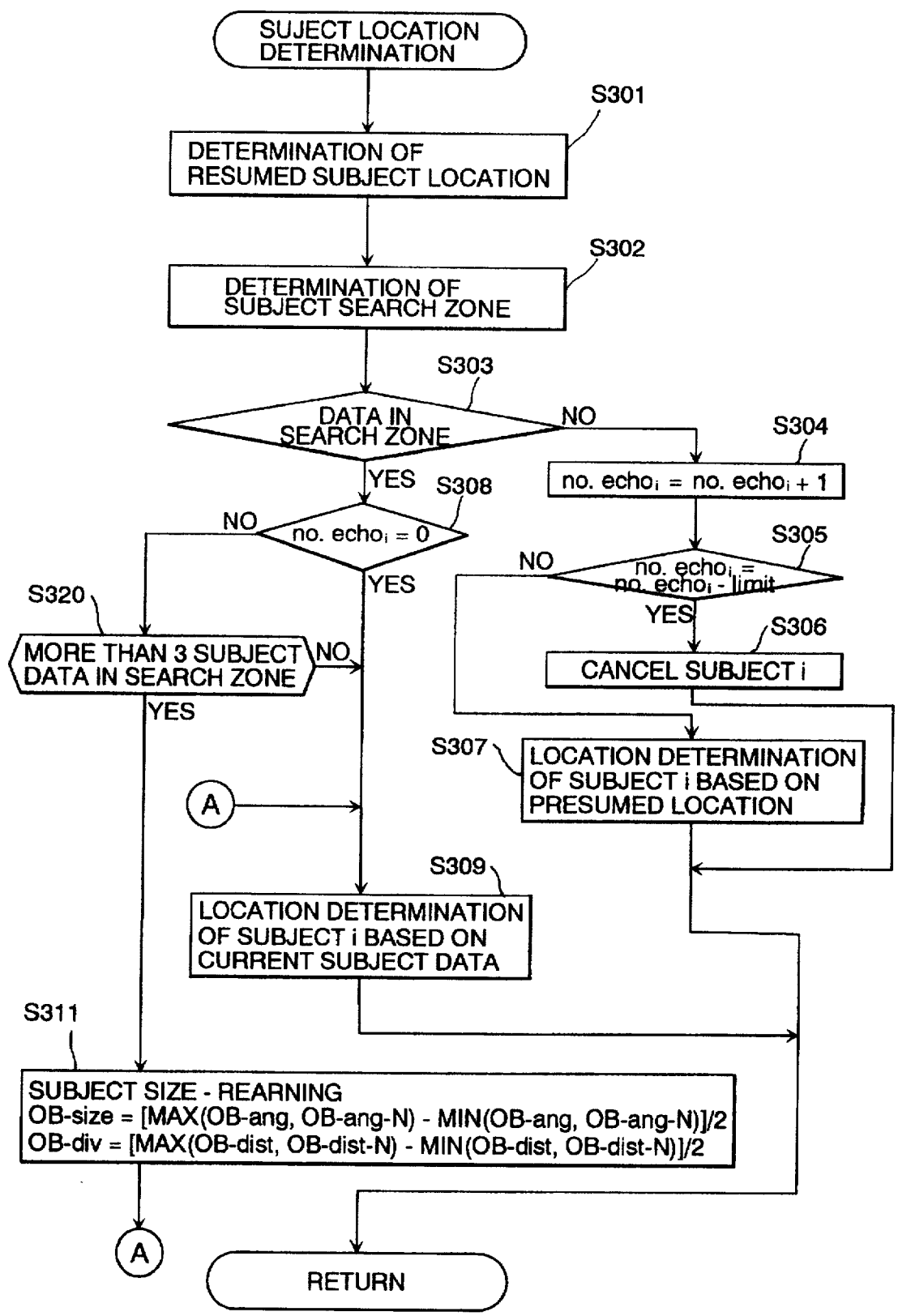
FIG. 12 is a flow chart illustrating an object size relearning and renewal sequence routine.

Re-learning and renewing a subject size is carried out in accordance with the sequence routine shown in FIG. 12. The presumed location of object where an object is expected to be present during a current scanning is given at step S301 on the basis of the following formula:

$$OB\text{-dist-}N = OB\text{-dist-}r\text{-vel} \times t$$
$$OB\text{-ang-}N = OB\text{-ang} - a\text{-vel} \times t$$
$$OB\text{-min-}N = OB\text{-ang-}N - OB\text{-size}/2$$
$$OB\text{-max-}N = OB\text{-ang-}N + OB\text{-size}/2$$
$$OB\text{-div-}N = OB\text{-div}$$

The object search zone is initially given at step S302 as follows:

$$OB\text{-K-dist-max} = OB\text{-dist-}N + OB\text{-div-}N + b1$$
$$OB\text{-K-dist-min} = OB\text{-dist-}N - b3$$
$$OB\text{-K-max} = OB\text{-ang-}N + b2/2$$
$$OB\text{-K-min} = OB\text{-ang-}N - b2/2$$

At step S303, data of the currently detected objects compared with data of the object search zone and the subject search zone so as to determine whether or not there is an object having the same data (OB-dist, OB-ang) as the currently detected object i in the object search zone. If there is no data, a number of data absent times no.echo$_i$ is changed by an increment of one (1) at step S304. In this instance, the number of data absent times no.echo$_i$ indicates how many times the currently detected object data did not conform with any data within the object search zone. When the number of data absent times no.echo$_i$ reaches a predetermined limit number no.echo$_i$-limit, it is reset to zero (0) and the entry of the object i is canceled through steps S305 and S306. Until the number of times no.echo$_i$ reaches the predetermined limit number no.echo$_i$-limit, the location of the current object i is determined based on the presumed object location of the current object i at step S307. That is, while the current object i is temporarily determined to be present in the current presumed location, a previous value id used for the size of the current object i.

If there is an object having the same data (OB-dist, OB-ang) as the currently detected object i in the object search zone, the object location of the current object i is determined based on the current data when the data absent time number no.echo$_i$ before the current scanning is zero (0) through steps 308 and S309. Accordingly, as to the object size, the previous object size is used. If the data absence time number no.echo$_i$ is not zero (0), this indicates that data of the current object i was absent during at least the last scanning, the object size is re-learned by the method of averaging and renewed so as to determine the location of the current object i based on the current data when the number of data is more than three (3) through steps S310, S311 and S309. Accordingly, the renewed data is used to determine the size of the current object i since then. For data renewing, employed is an average size of the previous value and a weighted value of the size (OB-size, OB-div) of the current object i which is determined on the basis of current data by the method of averaging. The re-learning may be repeated several times.

Accordingly, since, if the data of the current object i is not found in the object search zone for the object i, the entry of the object i is canceled only when several times of data absence are experienced, it is prevented to cancel the entry of an object i although there is actually present the object i. In addition, when data of the object i appears during subsequent scanning, re-learning is made for the size of the object i, it is advantageous to prove accurately an object.

Data absence occurs, for instance, when another object crosses between the subject vehicle and a detecting object or when the object i is detected inaccurately, in other words underrated in size in excess. Such underrating occurs, for instance, when reflected waves are very weak due to dirty reflector of a preceding object vehicle at a long distance from the subject vehicle or pitching of a preceding object vehicle driving on a bad road.

When a preceding object vehicle is detected to be smaller than an actual size, the object search zone set for the preceding vehicle is possibly too tight to catch data of the preceding vehicle in the object search zone. However, when the distance to the preceding object vehicle becomes shorter or when either or both vehicles become free from pitching, the data of the preceding vehicle appears within the object search zone. The fact that data of an object appears in and disappears from the object search zone indicates that, while the relative velocity is correct, the size of the object is incorrect. For this reason, the re-learning and renewing of object size is carried out. In this instance, the number of re-learning times of three (3) is considered to be satisfactory to provide sufficient data necessary for size detection within a tolerable error. Cancellation of the entry of an object i taking place when the data absence time number no.echo$_i$ reaches a specified number gives a determination that the object i has disappeared from the forward path of travel of the subject vehicle. The re-learning may be carried out every time data of an object i appears within the object search zone, however, this causes a demand a high operation capacity of a CPU and a misunderstanding that, when data of a plurality of objects accidently appear within the object search zone which is at a long distance from the subject vehicle, these objects are determined to be a single object. Accordingly, the re-learning is carried out only when data appears again after it has disappeared once.

Figure 13:
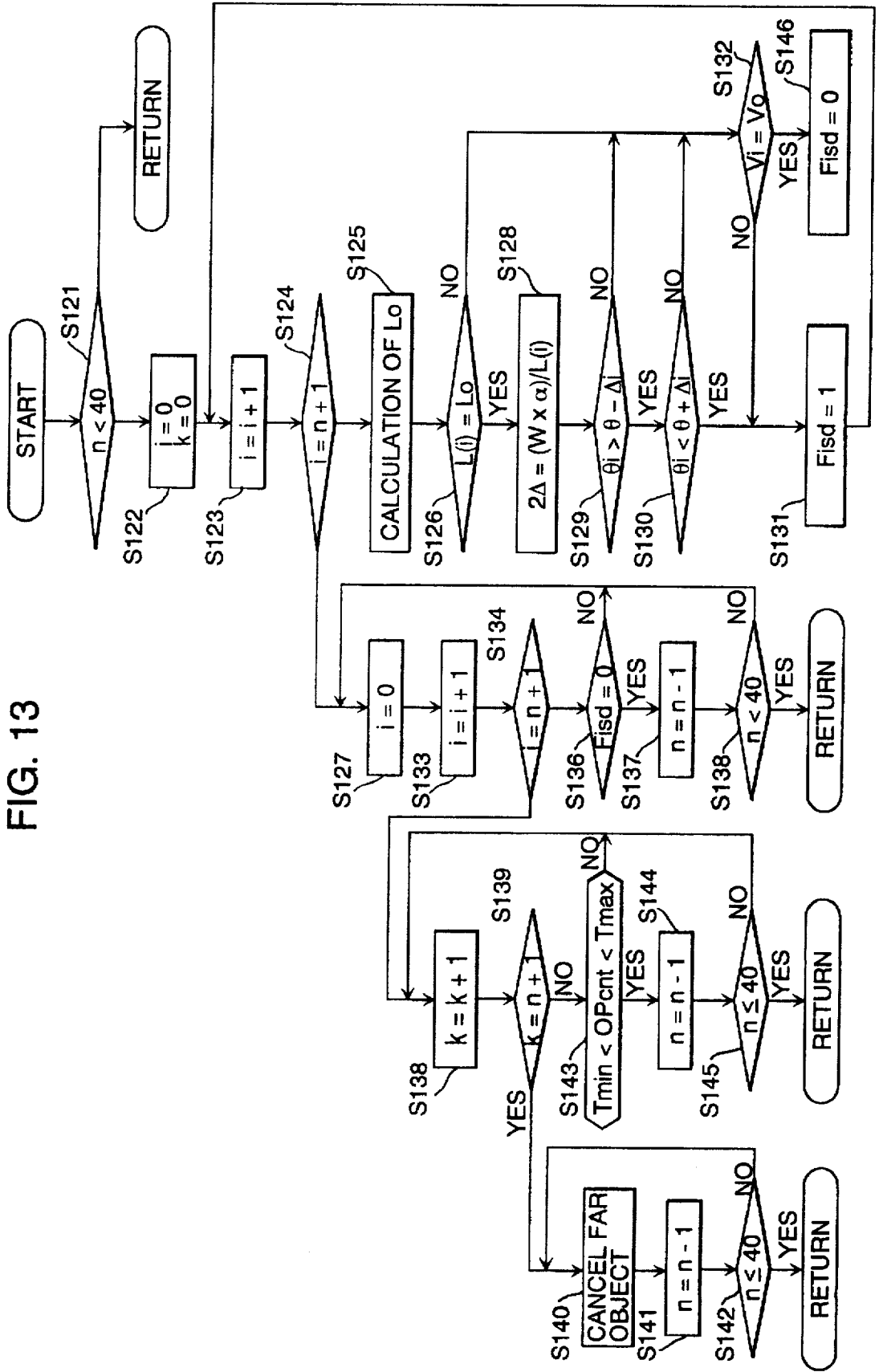
FIG. 13 is a flow chart illustrating an obstacle number restricting sequence routine.
Figure 14:
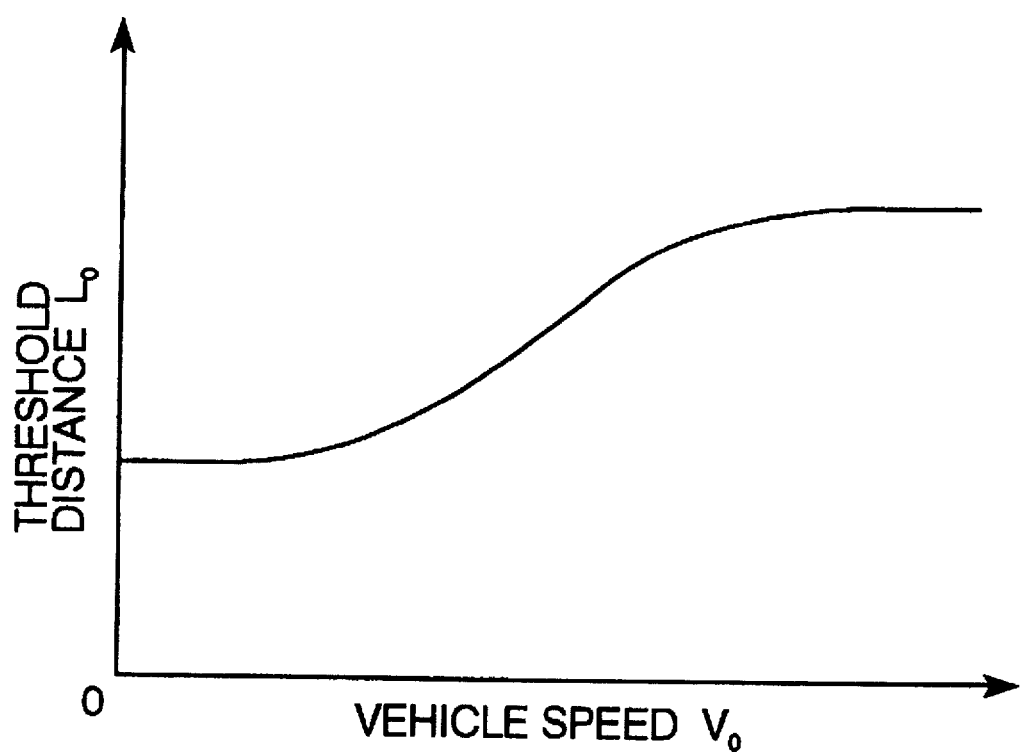
FIG. 14 is a graphic illustration of a map of threshold distance with respect to vehicle velocity.

Restriction of the number of objects is carried out in accordance with the sequence routine shown in FIG. 13. In the figure, when the sequence routine starts, a decision is made at step S121 as to whether or not the number of detected objects is less than 40. If there are objects less than forty, this indicates that the condition for object number restriction has been met, then, the sequence routine returns. On the other hand, if the object number is more than 40, this indicates that it is necessary to restrict the number of objects to be entered as obstacles to less than 40, the sequence routine proceeds to step S122 where, the object numbers i and k which are used to discriminate an object are respectively set to zero (0). After changing the object number i by an increment of 1 (one) at step S108, a decision is made at step S124 as to whether or not the object number i is larger by 1 (one) than the maximum number of objects n. If it is not equal to (n+1), a threshold distance Lo is found from a map such as shown in FIG. 14 based on the vehicle velocity Vo at step S125. Subsequently, a decision is made at step S126 as to whether or not the distance L(i) to an preceding object of a number i from the subject vehicle is less than the threshold distance Lo. On the other hand, if the object number i is equal to (n+1), this indicates that the decision has been completed relating to all of the objects, then, the object number i is reset to zero (0) at step S127.

If the object distance L(i) is less than the threshold distance Lo, the sequence routine proceeds to step S128 where the width W of the path of travel, which is represented by an angle 2Δi, at a distance L(i) is given as follows:

$$2\Delta i = (\text{path width} + \alpha)/L(i)$$

where α is a constant.

Subsequently, a decision is made at step S129 as to whether or not the directional angular θi of the object i from the subject vehicle is greater by an angle Δi than the directional angle φ of the center line of the path of travel. If it is greater, then another decision is consecutively made at step S130 as to whether or not the directional angular θi of the object i is smaller by the angle Δi than the directional angle φ of the center line of the path of travel. If it is smaller, this indicates that the object i is present within the path of travel having a lateral width represented by the angle Δi at both sides with respect to the center line, then, after setting a flag Fisd to "1" at step S131, the sequence routine returns to step S123. On the other hand, if the answer to the decision made at step S126, S129 or S130 is "NO", this indicates that the subject vehicle is sufficiently far from the object i or that there is no object present in the path of travel, then, the sequence routine proceeds to step S132 where a decision is made as to whether the relative velocity Vi between the object i and the subject vehicle is equal to the vehicle velocity Vo. Subsequently, the sequence routine returns to step S123 after setting the flag Fisd at step S131 if they are not equal, or after setting the flag Fisd is set to "0" at step S146 if they are equal.

In such a manner, the flag Fins which indicates whether an object is present in the path of travel within the threshold distance L(i) is set for all of the entered objects.

Further, after resetting of the object number i to zero (0) at step S127, the object number i is incrementally changed by one (1) at step S133. At step S134, a decision is made as to whether or not the object number i is larger by one (1) than the maximum number of objects n. If it is not equal to (n+1), this indicates that the decision has completed for all of the objects, then, the other object number k is incrementally changed by one (1) at step S135. On the other hand, if the object number i is not equal to (n+1), another decision is made at step S136 as to whether or not the flag isd has been down or set to "0". If the flag Fisd is down, this indicates that the object i is one for which there is no need to make a decision as to whether or not it is an obstacle and can be eliminated, then, the maximum number of objects n is changed by a decrement of 1 (one) at step S137. Therefore, a further decision is made at step S138 as to whether or not the maximum number of objects n is less than 40. If the maximum number of objects n is less than 40, this indicates that the condition relating to the object number limitation is satisfied, the sequence routine returns to step S127. If the flag Fisd has not been down, the sequence routine returns to S127.

After the incremental increase of the object number k by one (1) at step S135, a decision is made at step S139 as to whether or nor the object number k is larger by 1 (one) than the maximum number of objects n. If it is equal to (k+1), in order to satisfy the condition of object number limitation, it is necessary to reduce the number k of objects by canceling one object which is farthest away from the subject vehicle at step S140. After changing the total object number n by a decrement of one at step S141, a decision is made at step S142 as to whether or not the total object number n is less than 40. If it is less than 40, this indicates that the object number limitation is satisfied, the sequence routine returns. If the total number of objects n is not less than 40, then, the cancellation of farthest object is repeated until the object number limitation is satisfied through steps S140 and 141.

On the other hand, if the object number k is not equal to (n+1), a decision is made at step S143 as to whether or not the center position of the object k is within the specified angles from the center line of the path of travel as a reference, in other words whether or not the center position OPct of the object k is between the left side margin Tmin at a specified angle and right side margin Tmax at a specified angle. If it is between the left and right margins, then the total number of objects n is changed by a decrement of 1 (one) at step S144, and a decision is subsequently made at step S145 as to whether or not the total number of objects n is less than 40. If the total number of objects n is less than 40, the sequence routine returns. On the other hand, if it is not less than 40, then sequence routine is repeated from step S135. When the center position of the object k is not between the left and right side margins Tmin and Tmax, then, the sequence routine return to step S135.

In this way, in order to restrict the number of objects grasped as obstacles to 40 or less, up to the threshold distance Lo from the vehicle, objects present within the specified width of the path of travel from the reference center line are selected as obstacles precarious to the subject object. Objects which are present within the specified width of the center line of the object but far more than the threshold distance from the vehicle are selected as obstacles.

Figure 15:
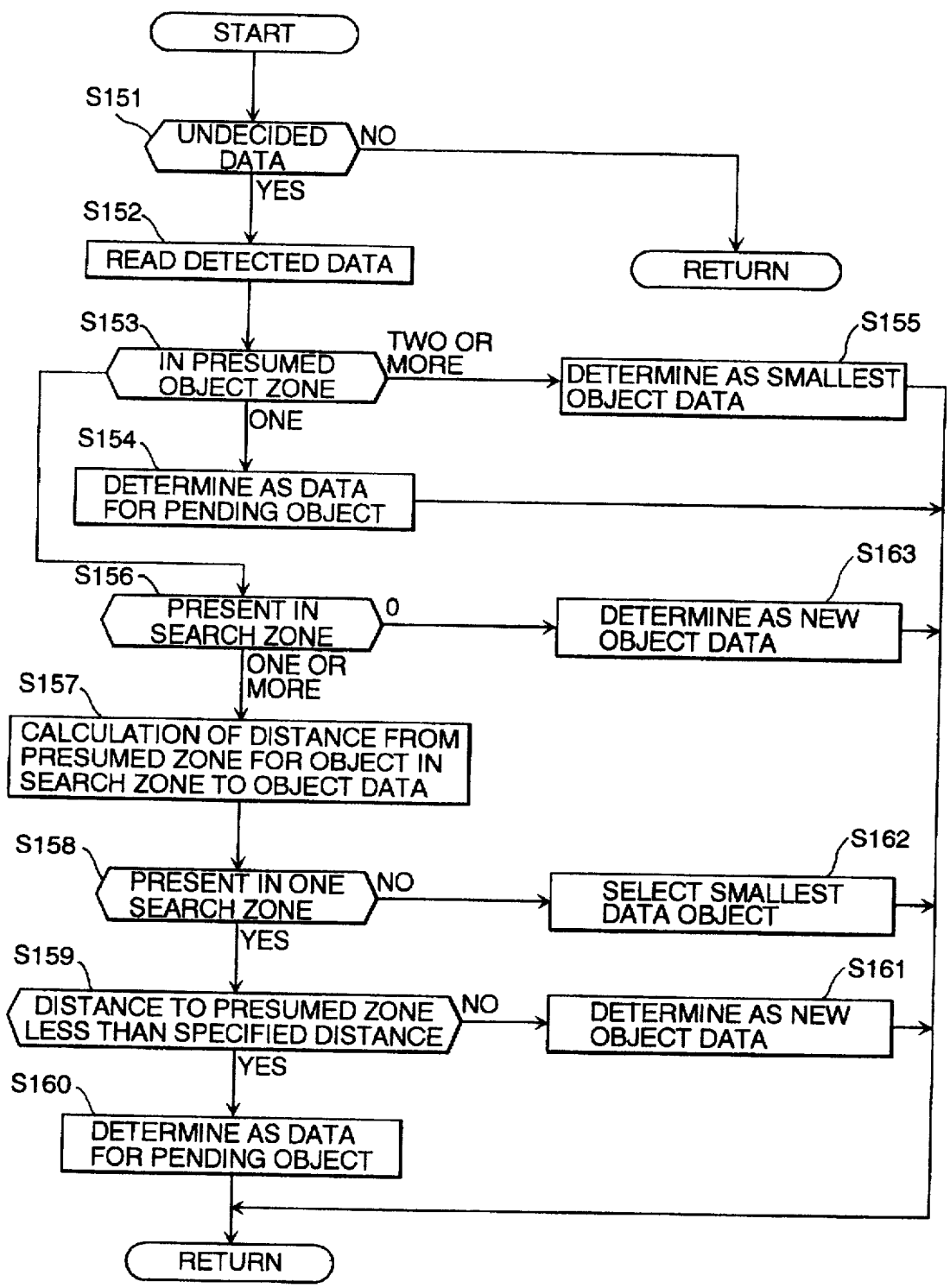
FIG. 15 is a flow chart illustrating an obstacle attribute determination sequence routine.

Determination of kinetic attributes is carried out in accordance with the sequence routine shown in FIG. 15. When the sequence routine starts, a decision is made at step S151 as to whether or not there are data relating to objects for which a determination of kinetic attributes has not been made. If the answer to the decision is "Yes," distances dist and the directional angles ang relating to the data of each undetermined objects are read in at step S152. On the other hand, if there is no data, the sequence routine returns.

After reading in the distances dist and the directional angles ang, a decision is made step S153 as to whether or not all of the objects having been entered are in the presumed object zones including the presumed object location at step S153. If being present in only one of the presumed object zones, the object data having the distances dist and directional angles ang is determined to be included as any one of the objects in the single presumed object zone at step S154. If being present in a plurality of the presumed subject zones, the object data having the distances dist and directional angles ang is determined to be included as the smallest one of the object at step S155. Thereafter, the sequence routine returns. On the other hand, if the object data is not present in any of the presumed object zones, a decision is made at step S156 as to whether or not all of the currently entered objects are in the object search zone. In this instance, in step S155, if the subject data is determined to be included as the smallest object, for instance, the subject data is included as two objects, namely the object of an object number a and an object of an object number b, a comparison is made between their lateral sizes OB-size(a) and OB-size(b). The data is determined to be included as either one of the objects of the object numbers a and number b which is smaller than the other. This is accomplished so as to prevent the size of an object under determination from becoming gradually larger and larger.

If the object data is present in one or more subject search zones, calculation is made of distances between the subject data from the presumed subject zones included these subject search zones at step S157, and subsequently, a decision is made at step S158 as to whether the number of object search zones in which the presence of the object data has been detected is one. If it is one, a further decision is made at step S159 as to whether or not the distance to the presumed subject zone is less than an predetermined distance. If the distance is shorter than the predetermined distance, the data is determined to be included for the object at step S160. If it is not shorter than the predetermined distance, the data is determined to be included for a new object at step S161.

If, according to the decision made at step S158, the number of object search zones in which the presence of the object data has been detected is not one, an object included in a presumed subject zone which is at the shortest distance to the subject having the data is selected at step S162. Thereafter, the sequence routine proceeds to step S159. In this instance, the selection of an object included in a presumed subject zone which is at the shortest distance to the subject having the data is based upon the consideration that the inclusion in the object having the smallest distance would be more reliable.

If, with the decision made in step S156, data is found not to be present in any of the object search zones, it is determined that the data is of a new object at step S163.

Figure 16:
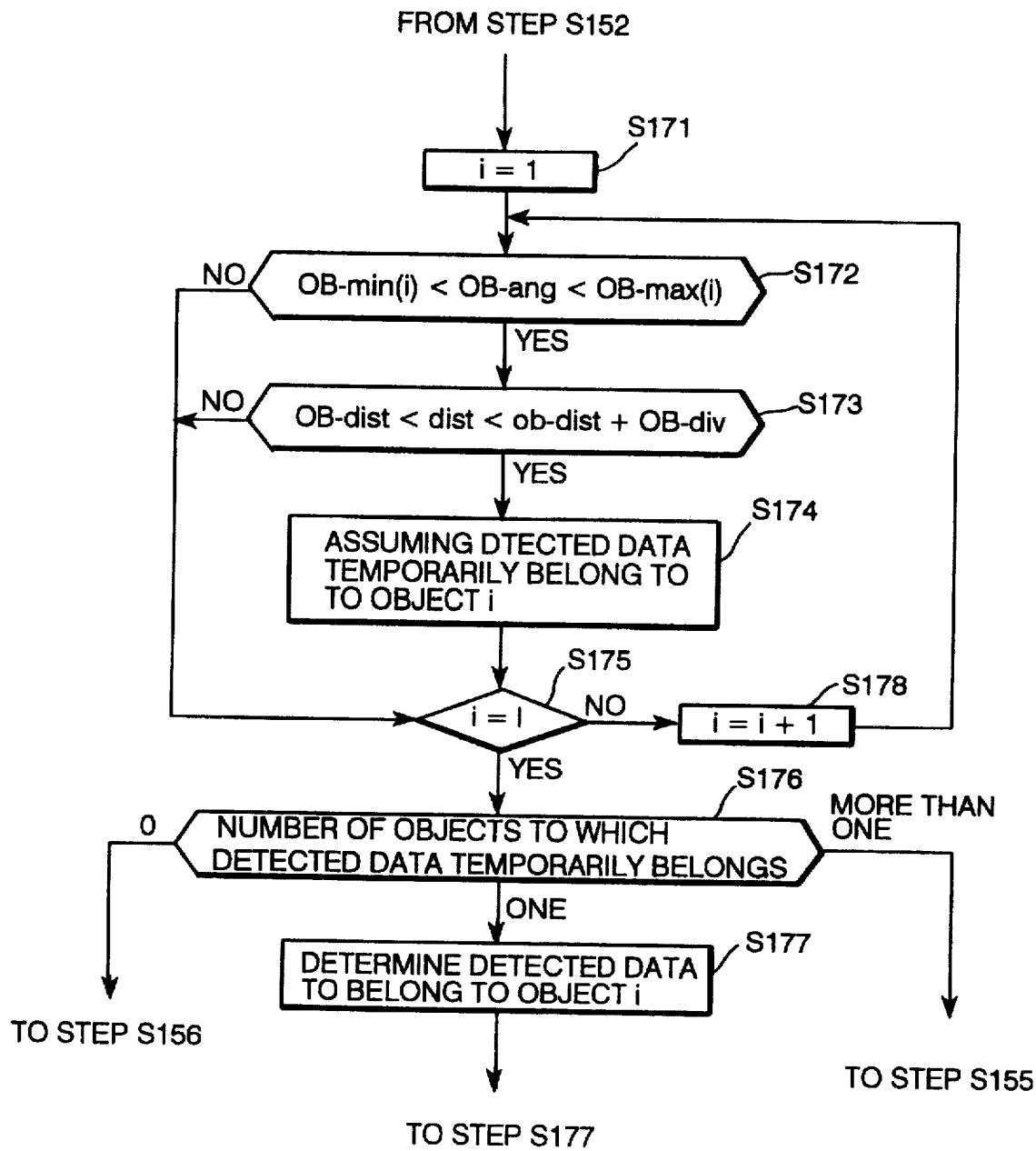
FIG. 16 is a flow chart illustrating a sequence routine for determining whether an object moves into a presumed object zone.

The decision at step S153 is accomplished practically in accordance with the sequence routine shown in FIG. 16.

As shown in FIG. 14, after reading in the distance dist and directional angle ang of certain data at step S152, the object number i is set to 1 at step S171. Subsequently, a decision is made at step S172 as to whether or not the directional angle ang falls between the felt and right lateral margins OB-min(i) and OB-max(i) of the presumed object zone. If the directional angle ang falls between the left and right lateral margins OB-min(i) and OB-max(i), another decision is made at step S173 as to whether or not the distance dist falls within the length of the presumed object zone, in other words whether or not it falls within a lengthwise extent of the presumed subject zone defined by a standard object distance OB-dist(i) and lengthwise spreads OB-div added together. If it does fall within the extent, the detected data temporarily applies to the object i at step S174. Then, the sequence routine proceeds to step S175. On the other hand, if the answer to each of the decisions made at steps S172 and S173 is "No", the sequence routine directly proceeds to step S175.

At step S175, a decision is made as to whether or not the object number i is equal to the number of entered objects L. If they are equal, the sequence routine proceeds to step S176 where a decision is made as to what is the number of objects to which the detected data temporarily applies. On the other hand, if the object number i is not equal to the number of entered objects L, the object number i is incrementally changed by 1 (one) at step S178, and the sequence routine returns to step S172. The steps S172–S174 are repeated until the object number i reaches the number of entered objects L.

The sequence routine proceeds to step S157 when the number of objects to which the detected data temporarily applies is zero, or to step S155 when the number of objects to which the detected data temporarily applies is one, or otherwise to step S158 when the number of objects to which the detected data temporarily applies is higher than one (1).

Figure 17:
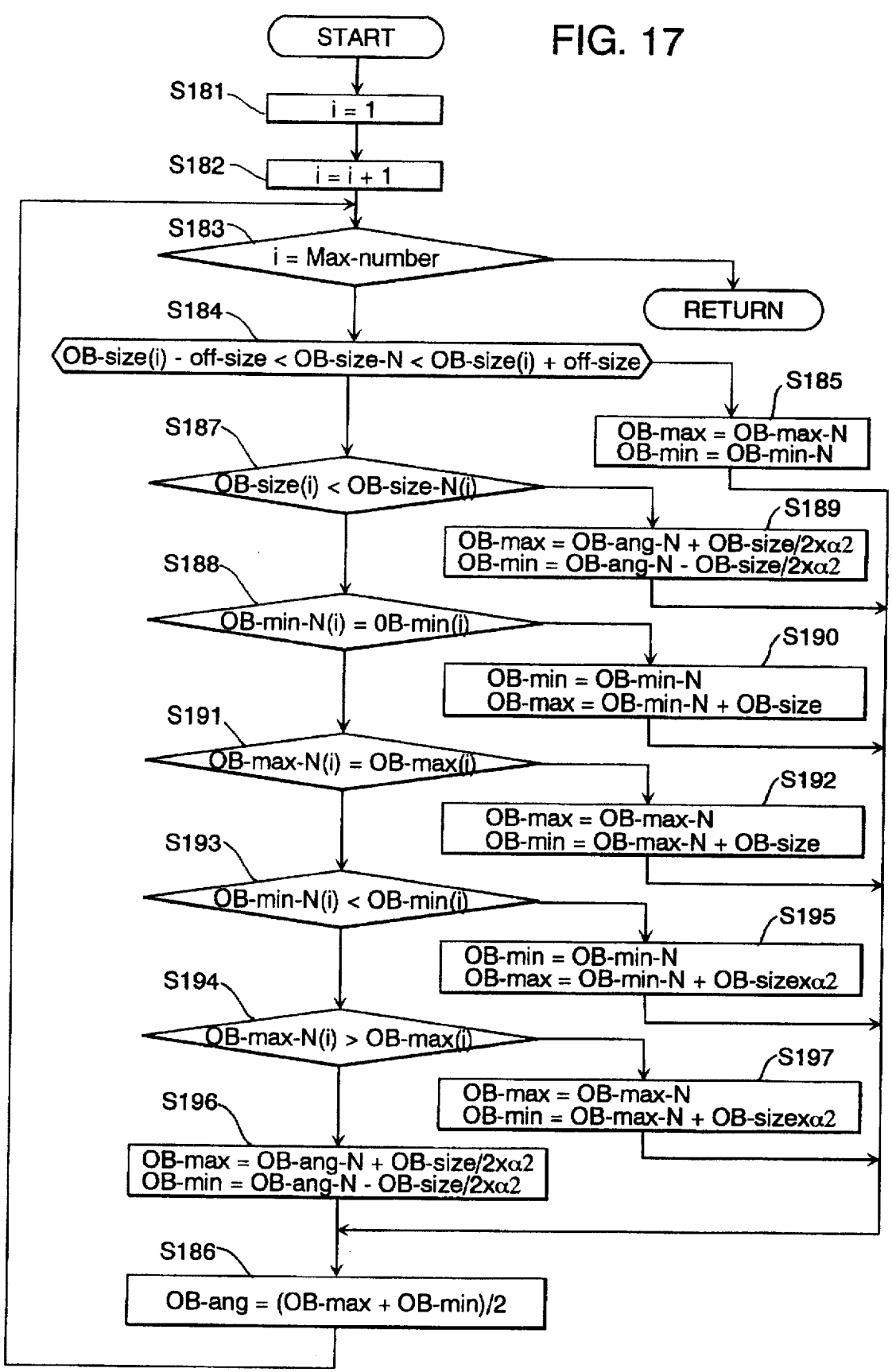
FIG. 17 is a flow chart illustrating a data changing sequence routine for an attribute of an object such as angle.

Transformation of kinetic attributes of an object is carried out according to the sequence routine shown in FIG. 17. As shown in FIG. 15, when the sequence routine starts, the object number i is reset to 0 (zero) at step S181 and subsequently incrementally changed by 1 (one) at step S182. Subsequently, a decision is made at step S183 as to whether or not the object number i is equal to the maximum number of objects Max-number. If they are equal, the sequence routine returns. If they are not equal, another decision is made at step S184 as to whether or not the size OB-size-N of the currently detected object i is between the size OB-size (i)-off-size and the size OB-size(i)+off-size. If the answer to the decision is "YES," then, the right and left margin OB-max and OB-min are substituted for the right and left margin OB-maxi-N and OB-min-N of a currently detected object at step S185. Subsequently, at step S186, the average of margins (OB-max+OB-min)/2 is taken as the directional angle OB-ang of the object. Thereafter, the sequence routine returns to step S183. On the other hand, if the answer is "NO," a decision is made at step S187 as to whether or not the object size OB-size(i) is greater than the size OB-size-N(i) of the currently detected object. When the answer is "YES", a decision is made at step S188 as to whether or not the left object margin OB-min(i) and the left object margin OB-min-N(i) of the currently detected object are equal to each other. If the answer to the decision made at step S187 is "NO" then, at step S189, the left and right object margins OB-max and OB-min are substituted by OB-ang-N+OB-size/2>α2 and OB-ang-N−OB-size/2×α2, respectively. Thereafter, the sequence routine proceeds to step S186. In this instance, α2 is a coefficient for transforming a length to an angle.

If the answer to the decision made at step S188 is "YES," then, at step S190, the right and left subject margins OB-max and OB-min are respectively substituted by the OB-max-N+OB-size and OB-min-N, and the sequence routine proceeds to step 186. On the other hand, if the answer is "NO," then, another decision is made at step S191 as to whether or not the right object margin OB-max(i) and the right margin OB-max-N(i) of the currently detected object are equal to each other. If the answer is "YES", then, at step S192, OB-max, and OB-min are respectively substituted by OB-max-N and OB-max-N+OB-size, and the sequence routine proceeds to step 186. If the answer is "NO", then, a decision is-made at step S193 as to whether or not the right margin OB-min-N(i) of the currently detected object is smaller than the right object margin OB-min(i). If the answer to the decision made at step S193 is "YES," then, at step S194, a further decision is made as to whether the right margin OB-max-N(i) of the currently detected object is greater than the right object margin OB-max(i). If the answer is "NO", then, at Step S195, OB-max and OB-min are respectively substituted by OB-max-N and OB-man-N−OB-size×α2, and the sequence routine proceeds to step S196.

If the answer to the decision made at step S194 is "YES," then, at step S195, the OB-max and OB-min are respectively substituted by OB-ang-K+OB-size/2×α2 and OB-ang-N−OB-size/2×α2. On the other hand, if the answer is "NO", then OB-max and OB-min are respectively substituted by OB-max-N and OB-max-N+OB-sizexα at step S197, and the sequence routine proceeds to step S186.

Figure 18:
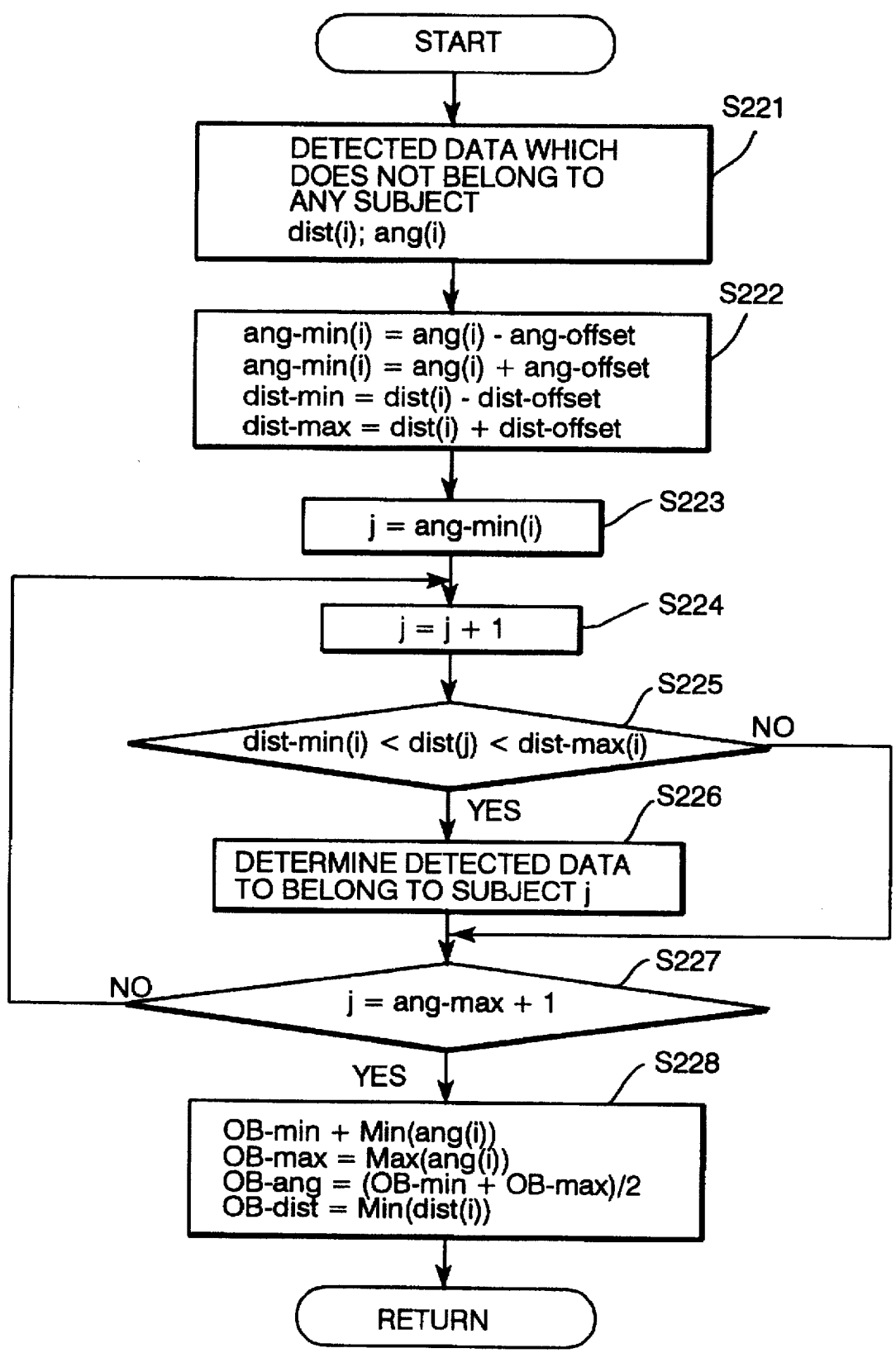
FIG. 18 is a flow chart illustrating a new object entry sequence routine.

Entry of new objects is carried out according to the sequence routine shown in FIG. 18. When the sequence routine starts, the distance and angle dist(i) and ang(i) of each object which has a data number i that is not included as any one of the object having been entered are read in at step S221. The minimum and maximum data, such as the minimum angle ang-min(i), the maximum angle ang-max(i), the minimum distance dist-min (i) and the maximum distance dist-max(i), are calculated at step S222 from the following formulas:

$$\text{ang-min}(i) = \text{ang}(i) - \text{ang-offset}$$
$$\text{ang-max}(i) = \text{ang}(i) + \text{ang-offset}$$
$$\text{dist-min}(i) = \text{dist}(i) - \text{dist-offset}$$
$$\text{dist-max}(i) = \text{dist}(i) + \text{dist-offset}$$

Thereafter, a variable j is taken as the minimum angle ang-min(i) at Step S223. After changing the variable j by an increment of 1 (one) at step S224, with regard to an object having an object number j, a decision is made at Step S225 as to whether or not the distance dist(j) is between limit distances, namely the minimum distance dist-min(i) and the maximum distance dist-max(i). If it is between the limit distances dist-min(i) and dist-max (i), then, the subject which has a data number j is determined to belong the object i at Step S226. Subsequently, a decision is made at step S227 as to whether or not the number j of subject data is equal to ang-max(i)+1. On the other hand, if the distance dist(j) is not between limit distances, the minimum distance dist-min(i) and the maximum distance dist-max(i), the sequence routine proceeds directly to step S227.

If the variable j is the same as the maximum distance ang-max(i)+1, this indicates that the decisions relating to all directional angles ang(i) to the ang-max(i) from the ang-min(i) are completed, then, OB-min, OB-max, OB-ang and OB-dist are substituted as followings at step S228:

$$\text{OB-min} = \text{Min}(\text{ang}(i))$$
$$\text{OB-max} = \text{Max}(\text{ang}(i))$$
$$\text{OB-ang} = (\text{OB-min} + \text{OB-max})/2$$
$$\text{OB-dist} = (\text{Min}(\text{dist})(i))$$

If the variable j is not the same as ang-max(i)+1, then, the sequence routine returns to Step S224.

Figure 19:
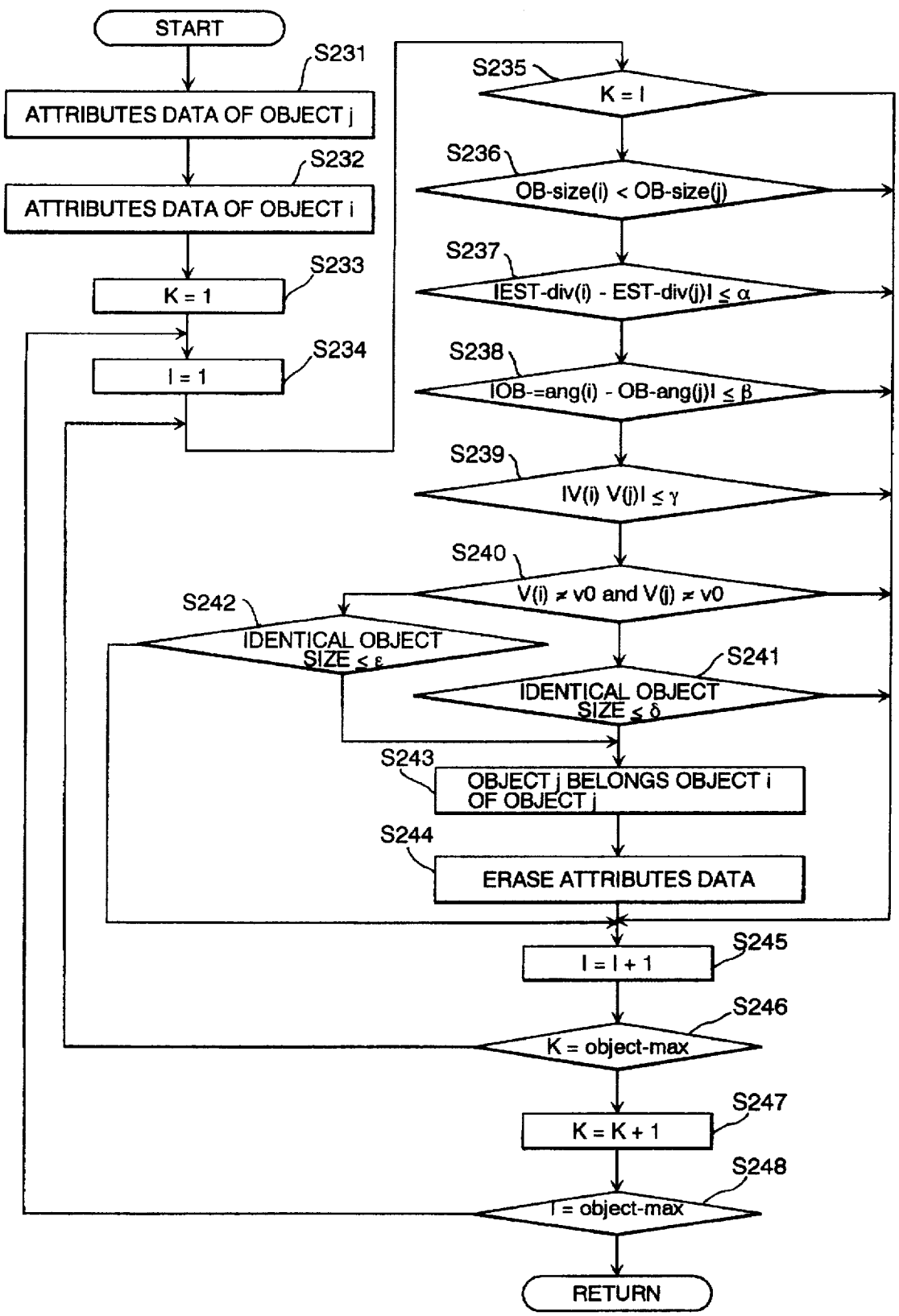
FIG. 19 is a flow chart illustrating an object identity determination sequence routine.

The identity of objects are determined according to the sequence routine shown in FIG. 19. In FIG. 19, when the sequence routine starts, in order to determine the identity between two objects having object numbers j and i, the kinetic attributes of the respective objects j and i, specifically relative velocities V(j) and V(i), longitudinal size OB-div(j) and OB-div(i), transverse size OB-size(j) and OB-size(i), and directional angles OB-ang(j) and OB-ang(i) are read in order of object number at Step S231 and S232. Subsequently, the variables are set to 1 (one) at steps S233 and S234, respectively. Since no decision is necessary with respect to two identical objects, a decision is made at step S235 as to whether or not the variables K and I are uneven. If they are uneven, in order to avoid redundancy, a decision is made at step S236 as to whether of not the size OB-size (i) in the lateral direction of the object (i) is smaller than the size OB-size (j) in the lateral direction of the object (object no. j). If the lateral size OB-size(i) of the object i is smaller than the lateral size OB-size(j) of the object j, in order to limit variations, a decision is made at step S237 as to whether or not the absolute value of the difference between the lengthwise size OB-div(i) of the object i and the lengthwise size OB-div(j) of the object j is less than the specified value α. If it is less than the specified value α, then, another decision is made at step S238 as to whether or not the absolute value of the difference between the directional angle OB-ang(i) of the object i and the directional angle OB-ang(j) of the object j is less than the specified value β. If it is less than the specified value β, a decision is made at step S239 as to whether or not the absolute value of the difference between the relative velocity V(i) of the object i and the relative velocity V(j) of the object j is less than the specified value τ. If it is less than the specified value τ, then a decision is made at step S240 as to whether or not both respective relative velocities V(i) and V(j) are unequal to the vehicle velocity V0 of the vehicle, and whether or not it is a stationary object or a moving object.

If both velocities are unequal to the vehicle velocity V0, then, it is a moving object, and a decision is made at step S241 as to whether or not the size, as the same object, is less than the specified value δ. On the other hand, if the velocities are not unequal to the velocity V0, it is a stationary object, a decision is made at step S242 as to whether or not its size, as the same object, is less than the specified value ε(>δ). The reason that the specified value ε is larger than the specified value δ is that a moving object is possibly a vehicle which is limited in size to some extent and, however, a stationary object is not always limited in size and may be somewhat large.

If the size is less than the specified values δ and ε, then, the object j is considered to be included as an object i at step S243. Accordingly, the kinetic attributes of the object i are entered again and the kinetic attributes of the object j are erased at step 244. On the other hand, the size is less than the specified values δ and ε, then, the variable I is incrementally changed by 1 (one) at step S245. Subsequently, a decision is made at step S246 as to whether or not the variable I has reached the maximum number of objects object-max. If the variable I is equal to the maximum object number object-max, then, the variable K is added by 1 (one) at step S247, and a decision is subsequently made at step S248 as to whether or not the variable K has reached the maximum object number object-max. On the other hand, if it is not equal, then, the sequence routine returns to step S235. Also, if the variable K is equal to the maximum number object-max, then, the sequence routine returns. On the other hand, if they are not equal each other, then, the sequence routine returns to step S234.

In this instance, when the answer to the decision made at each step of steps S235–S242 is "NO," the sequence routine always proceeds to step S245.

Figure 20:
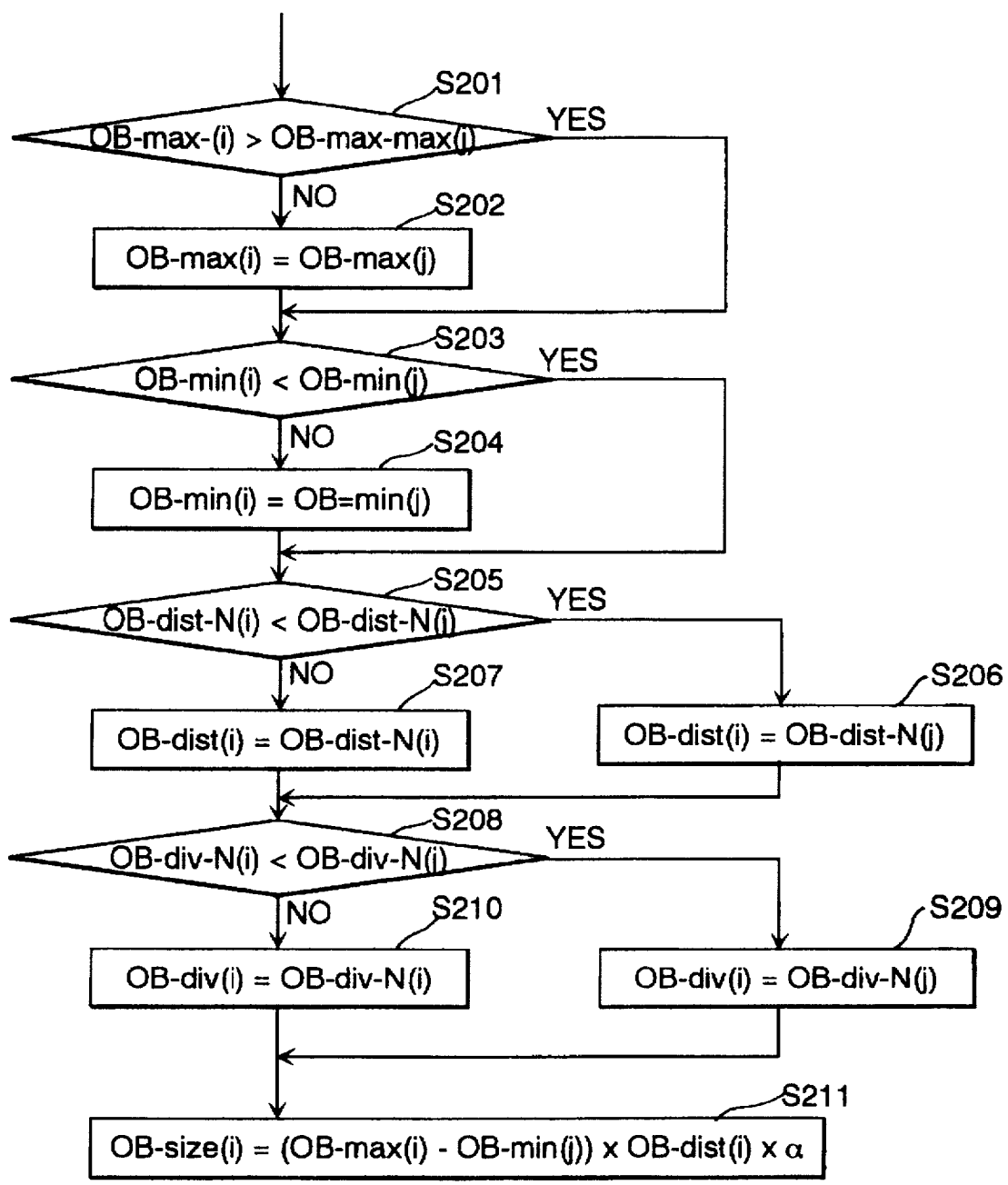
FIG. 20 is a flow chart illustrating a data changing sequence routine for attributes of an object such as distance, angle, size and variation.

Entry of object kinetic attributes is carried out according to the sequence routine shown in FIG. 20. In FIG. 20, when the sequence routine starts, a decision is made at step S201 as to whether or not the right margin OB-max(i) of the object i is larger than the right margin OB-max(j) of the object j. If the right margin OB-max(i) of the object i is not larger than the right margin OB-max(j) of the object j, the right margin OB-max(i) of the object i is substituted for the right margin OB-max(j) of the object j at step S202. Thereafter, a decision is made at step S203 as to whether or not the left margin OB-min(i) of the object i is smaller than the left margin OB-min(j) of the object j. If the right margin OB-max(i) of the object i is larger than the right margin OB-max(j) of the object j, the sequence routine proceeds directly to step S203. At step S203, a decision is made as to whether or not the left margin OB-min(i) of the object i is smaller than the left margin OB-min(j) of the object j. If the left margin OB-min (i) of the object i is not smaller then the left margin OB-min(j) of the object j, then, the left margin OB-min(i) of the object i is substituted for the left margin OB-min(j) of the object j at step S204. A decision is made at step S205 as to whether or not the distance OB-dist-N(i) to the currently detected object i is smaller than the distance OB-dist-N(j) to the currently detected object j. If the distance OB-dist-N(i) is smaller than the distance OB-dist-N(j), then, the sequence routine directly proceeds to step S205.

If the distance OB-dist-N(i) to the currently detected object i is smaller than the distance OB-dist-N(j) to the currently detected object j, then, the distance OB-dist-N(i) is substituted for the distance OB-dist(i) at step S206. On the other hand, if the distance OB-dist-N(i) to the currently detected object i is not smaller than the distance OB-dist-N(j) to the currently detected object j, then, the distance OB-dist-N(j) to the currently detected object j is substituted for the distance OB-dist(i) at step S207. Subsequently, a decision is made at step S208 as to whether or not the lengthwise size OB-div-N(i) of the currently detected object i is smaller than the lengthwise size OB-div-N(j) of the currently detected object j. If the lengthwise size OB-div-N(i) of the currently detected object i is smaller than the lengthwise size OB-div-N(j), then, the lengthwise size OB-div-N(i) of the currently detected object i is substituted for the lengthwise size OB-div(i) of the object i at step S209. On the other hand, if the lengthwise size OB-div-N(i) of the currently detected object i is not less than the lengthwise size OB-div-N(j) of the currently detected object j, the lengthwise size OB-div-N(j) of the currently detected object j is substituted for the lengthwise size OB-div(i) of the object i at step S210. Thereafter, the lateral size OB-size(i) of the object i is substituted by (OB-max(i)−OB-min(j))×OB-dist(i)×α at step S211. In this instance, α is a constant.

In the instances if the vehicle is traveling on a highway, the sequence routine may be simplified as described hereafter. The decision as to whether or not the vehicle is running on a highway is accomplished with regard to whether or not the vehicle speed is greater than 80 km/hr.

Figure 21:
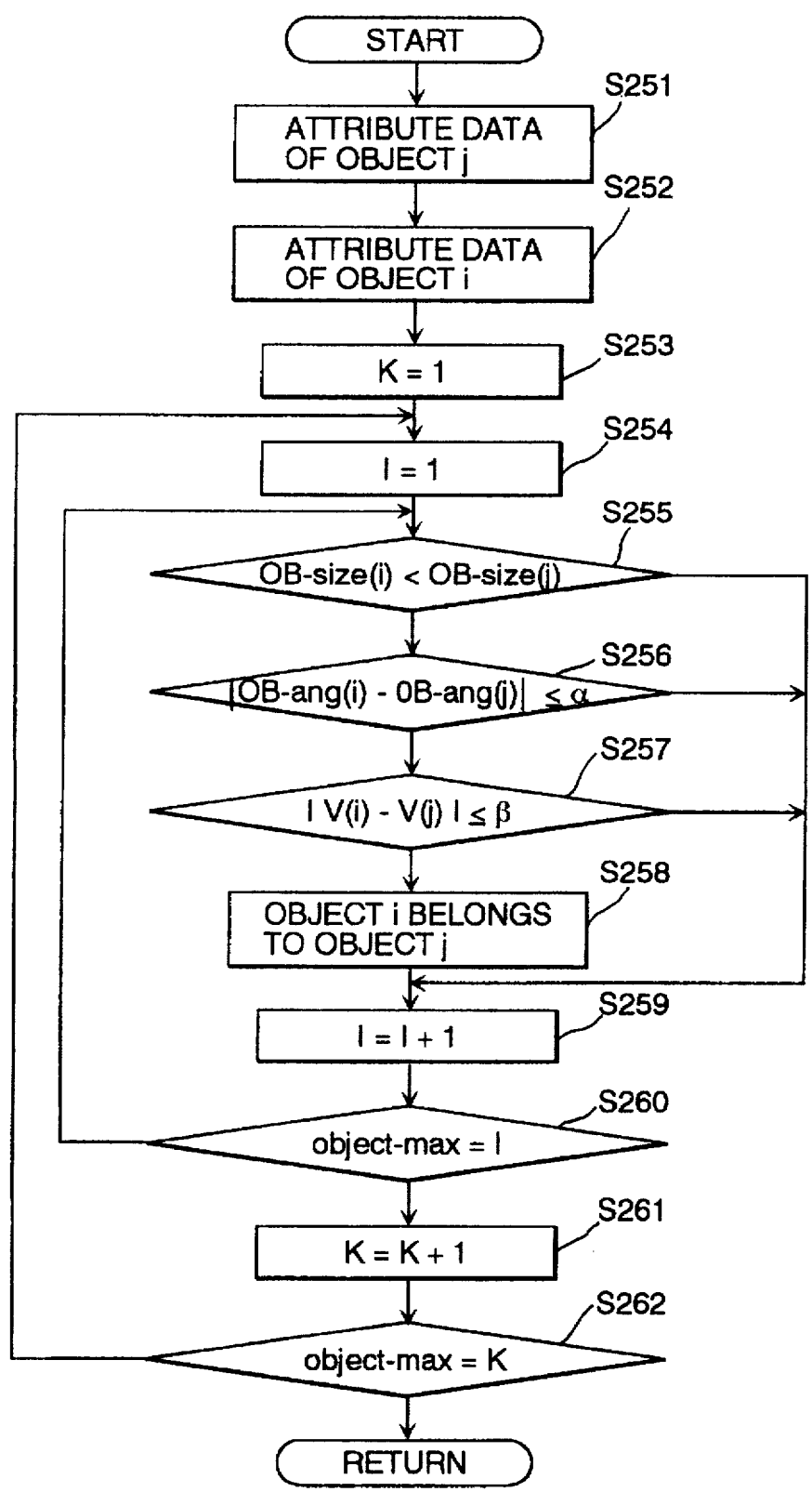
FIG. 21 is a flow chart illustrating a variation of the object identity determination sequence routine.

Referring to FIG. 21, the object kinetic attributes are read in relating to two objects having object numbers j and i at steps S251 and S252, respectively. Through steps S253 and S254, the variables K and I are set to 1 (one). Subsequently, a decision is made at step S255 as to whether or not the lateral size OB-size(i) of the object i is smaller than the lateral size OB-size(j) of the object j. If the lateral size OB-size(i) of the object i is smaller than the lateral size OB-size(j) of the object j, then, another decision is subsequently made at step S256 as to whether or not the absolute value of the difference between the directional angles OB-ang(i) and OB-ang(j) of the objects i and j is less than the specified value α. If it is less than the specified value α, then, a decision is made at step S257 as to whether or not the absolute value of the difference between the relative velocities V(i) and V(j) is less than the specified value β. If the absolute difference is less than the specified value β, then, it is determined that the object j is included as the object i, and while the data relating to the kinetic attributions of the object i is renewed, the data relating to the kinetic attributions of the object j is erased at step S258. After incrementally changing the variable I by 1 (one) at step S259, a decision is made at step S260 as to whether or not the variable I has reached the maximum object number object-max. If having not yet reached, then, the sequence routine returns to step S255. If the variable I has reached the maximum number object-max, then, the variable K is incrementally changed by 1 (one) at step S261, and a decision is subsequently made at step S262 as to whether or not the variable K has reached the maximum number of objects j object-max. If the variable K has not reached the maximum number object-max, then, the sequence routine returns to step S254. If having reached, the sequence routine returns.

If the answer to the decision made at any one of steps S255, S256 and S257 is "NO," the sequence routine proceeds directly to step S259.

It is to be understood that although the present invention has been described in connection with preferred embodiments thereof, various other embodiments and variants may occur to those skilled in the art, which are within the scope and spirit of the invention, and such other embodiments and variants are intended to be covered by the following claims.

What is claimed is:

1. An obstacle detection system for a vehicle for detecting an obstacle in the forward path of travel of the vehicle, said obstacle detection system comprising:

object detecting means equipped in a vehicle for detecting kinetic attributes relative to the vehicle of an object present in a forward path of travel of said vehicle at predetermined regular intervals;

object zone setting means for setting a presumed object zone into which said object at a preceding detection is presumed to enter at a latest detection of said object based on said kinetic attributes provided during said preceding detection of said object; and object proving means for proving an object of said latest detection as said object of said preceding detection when said object of said latest detection is determined to be one that has moved into said presumed object zone based on comparison of kinetic attributes provided during said latest detection of said object with said presumed object zone.

2. An obstacle detection system as defined in claim 1, wherein said kinetic attributes include at least a distance to said object from the vehicle, a directional angle of said object relative to the object and a velocity of said object relative to the vehicle.

3. An obstacle detection system as defined in claim 2, wherein said kinetic attributes further include a size of said object.

4. An obstacle detection system as defined in claim 3, wherein said object detecting means detects an object a number of times during a predetermined detection period of time and determines a size of said object by a method of data averaging.

5. An obstacle detection system as defined in claim 2, further comprising object entry means for selecting objects estimated as obstacles precarious to the vehicle among a plurality of said objects proved by said object proving means and entering only said selected objects as obstacles, and object identifying means for comparing kinetic attributes of each said objects entered with those of another so as to determine identity of each said object with another.

6. An obstacle detection system as defined in claim 5, wherein said object identifying means changes a condition on which identity of each said object with another is determined according to whether said object is moving or stationary.

7. An obstacle detection system as defined in claim 5, wherein said object entry means renews kinetic attributes of said objects entered at regular intervals.

8. An obstacle detection system as defined in claim 2, further comprising object search zone setting means for setting an object search zone surrounding said presumed object zone, wherein said object proving means proves an object of said latest detection as said object of said preceding detection when said object of said latest detection is determined to be one that has moved into one of said presumed object zone and said object search zone based on comparison of kinetic attributes provided during said latest detection of said object with said presumed object zone and said object search zone.

9. An obstacle detection system as defined in claim 2, wherein said object detecting means detects an object a number of times during a predetermined detection period of time and defining an object by one of said kinetic attributes obtained by said number of times of detection most suitable for obstacle determination.

10. An obstacle detection system for a vehicle for detecting an obstacle in the forward path of travel of the vehicle, said obstacle detection system comprising:

object detecting means equipped in a vehicle for detecting kinetic attributes relative to the vehicle of an object present in a forward path of travel of said vehicle;

object zone setting means for setting a presumed object zone into which said object is presumed to have entered at a lapse of a predetermined period of time based on said kinetic attributes provided during a first detection of said object;

object proving means for proving an object second detected at a lapse of said predetermined period of time by said object detecting means as said object of said first detection when said object of said second detection is determined to be one that has moved into said presumed object zone based on comparison of kinetic attributes provided during said second detection of said object with said presumed object zone; and object entry means for selecting objects estimated as obstacles precarious to the vehicle among a plurality of said objects proved by said object proving means and entering only said selected objects as obstacles, and object identifying means for comparing kinetic attributes of each said objects entered with those of another so as to determine identity of each of said objects with another.

11. An obstacle detection system as defined in claim 10, further comprising object search zone setting means for setting an object search zone surrounding said presumed object zone, wherein said object proving means proves an object of said second detection as said object of said first detection when said object of said second detection is determined to be one that has moved into one of said presumed object zone and said object search zone based on comparison of kinetic attributes provided during said second detection of said object with said presumed object zone and said object search zone.

12. An obstacle detection system as defined in claim 10, wherein said object entry means restricts objects to be entered to less than a predetermined number.

13. An obstacle detection system as defined in claim 10, wherein said object entry means cancels entry of said objects in order of unnecessary degree for obstacle determination so as to enter said object up to said predetermined number.

14. An obstacle detection system as defined in claim 13, wherein said object entry means deletes an object having been entered when said object detecting means does not detect said object continually a predetermined number of times.

15. An obstacle detection system as defined in claim 10, wherein said object entry means changes standards for selecting objects as obstacles precarious to the vehicle between lengthwise distances from the vehicle within and beyond a predetermined distance.

16. An obstacle detection system as defined in claim 15, wherein said object entry means changes said predetermined distance longer with an increase in a velocity of the vehicle.

17. An obstacle detection system as defined in claim 10, wherein said object entry means selects, as obstacles precarious to the vehicle, objects present within a predetermined lateral width stretching from a center line of said forward path of travel for lengthwise distances within said predetermined distance and objects present within a predetermined directional angular with respect to said center line of said forward path of travel for lengthwise distances beyond said predetermined distance.

18. An obstacle detection system as defined in claim 17, wherein said object entry means selects, as obstacles precarious to the vehicle, objects present within a predetermined lateral width stretching from a center line of said forward path of travel for lengthwise distances within said predetermined distance and objects having predetermined relative velocity vectors for lengthwise distances beyond said predetermined distance.

19. An obstacle detection system as defined in claim 18, wherein said object zone setting means changes said presumed object zone in lengthwise distance between lengthwise distances from the vehicle within and beyond said predetermined distance.

20. An obstacle detection system as defined in claim 10, wherein, when an object of said second detection is determined to have moved into and been present in both said presumed object zone and said object search zone, said object proving means proves that said object has moved into one of said presumed object zone and said object search zone in which smaller one of said objects is present.

21. An obstacle detection system as defined in claim 10, wherein said object zone setting means changes said presumed object zone in lateral distance between lengthwise distances from the vehicle within and beyond said predetermined distance.

22. An obstacle detection system as defined in claim 10, wherein said object detecting means includes a radar unit for scanning a field forward from the vehicle.

23. An obstacle detection system as defined in claim 1, further comprising object search zone setting means for setting an object search zone surrounding said presumed object zone, wherein said object proving means proves an object of said second detection as said object of said preceding detection when said object of said latest detection is determined to be one that has moved into one of said presumed object zone and said object search zone based on comparison of kinetic attributes provided during said latest detection of said object with said presumed object zone and said object search zone.

24. An obstacle detection system as defined in claim 1, wherein said object detecting means changes an extent of detection according to distances of objects forward from the vehicle.

25. An obstacle detection system as defined in claim 1, wherein, when an object is present in said presumed object zone, said object proving means unconditionally proves that said object has moved into said presumed object zone.

26. An obstacle detection system as defined in claim 1, wherein, when an object is present out of said presumed object zone and said object search zone, said object proving means proves that said object is a new object.

* * * * *